(12) United States Patent  (10) Patent No.: US 8,621,738 B2
Iwamoto et al.  (45) Date of Patent: Jan. 7, 2014

(54) GLASS CUTTING APPARATUS, GLASS-SUBSTRATE DISASSEMBLING APPARATUS, GLASS-SUBSTRATE DISASSEMBLING SYSTEM, GLASS CUTTING METHOD, AND GLASS-SUBSTRATE DISASSEMBLING METHOD

(75) Inventors: Hiroshi Iwamoto, Osaka (JP); Yoshiyuki Tani, Osaka (JP); Fumio Yamazaki, Osaka (JP); Takao Hisazumi, Osaka (JP)

(73) Assignee: Panasonic Corporation, Osaka (JP)

( * ) Notice: Subject to any disclaimer, the term of this patent is extended or adjusted under 35 U.S.C. 154(b) by 1302 days.

(21) Appl. No.: 12/445,606

(22) PCT Filed: Oct. 5, 2007

(86) PCT No.: PCT/JP2007/069592
§ 371 (c)(1),
(2), (4) Date: Apr. 15, 2009

(87) PCT Pub. No.: WO2008/047622
PCT Pub. Date: Apr. 24, 2008

(65) Prior Publication Data
US 2010/0288101 A1  Nov. 18, 2010

(30) Foreign Application Priority Data
Oct. 16, 2006 (JP) .................................. 2006-281086

(51) Int. Cl.
*B23P 11/00* (2006.01)
*B23P 19/00* (2006.01)
(52) U.S. Cl.
USPC ....... 29/426.1; 29/426.3; 29/426.4; 29/426.5; 29/700; 29/791; 29/284; 225/96.5
(58) Field of Classification Search
USPC ............... 29/417, 426.1, 426.3, 426.4, 426.5, 29/700, 791, 239, 284; 83/885; 225/96.5
See application file for complete search history.

(56) References Cited

U.S. PATENT DOCUMENTS 6,774,978 B2 * 8/2004 Shin .............................. 349/187
7,131,562 B2 * 11/2006 Ueyama et al. ............... 225/96.5
(Continued)

FOREIGN PATENT DOCUMENTS

JP  5-273525  10/1993
JP  6-48755  2/1994
(Continued)

OTHER PUBLICATIONS

English International Preliminary Report on Patentability (PCT/IB/338, PCT/IB/373) and Written Opinion of the International Searching Authority (PCT/ISA/237) issued Apr. 22, 2009 in International Application No. PCT/JP2007/069592, of which the present application is the U.S. National Stage.

(Continued)

*Primary Examiner* — Jermie Cozart
(74) *Attorney, Agent, or Firm* — Wenderoth, Lind & Ponack, L.L.P.

(57) ABSTRACT

A glass cutting apparatus (101) includes a pair of cutters (13a, 13b) installed oppositely to each other in such a way as to sandwich, therebetween, a glass plate with surfaces of the glass plate thereof being along a vertical direction; a first pressing unit (14a) which presses one of the cutters to one of the surfaces of the glass plate in a horizontal direction with a pressing force P; a second pressing unit (14b) which is placed oppositely to the first pressing unit and presses the other one of the cutters to the other surface of the glass plate in the horizontal direction with the pressing force P; and a moving unit (20) which moves the pair of cutters pressing the glass plate with the pressing force P.

20 Claims, 22 Drawing Sheets

(56) References Cited

U.S. PATENT DOCUMENTS

| | | |
|---|---|---|
| 2004/0040997 A1* | 3/2004 | Ueyama et al. .............. 225/96.5 |
| 2004/0074366 A1* | 4/2004 | Choo et al. ...................... 83/886 |
| 2005/0229755 A1 | 10/2005 | Okajima et al. |
| 2009/0156081 A1* | 6/2009 | Kirihara et al. ................... 445/2 |

FOREIGN PATENT DOCUMENTS

| | | |
|---|---|---|
| JP | 8-119654 | 5/1996 |
| JP | 2001-302264 | 10/2001 |
| JP | 2002-50295 | 2/2002 |
| JP | 2004-224592 | 8/2004 |
| WO | 2004/007164 | 1/2004 |

OTHER PUBLICATIONS

International Search Report issued Dec. 4, 2007 in the International (PCT) Application of which the present application in the U.S. National Stage.

* cited by examiner

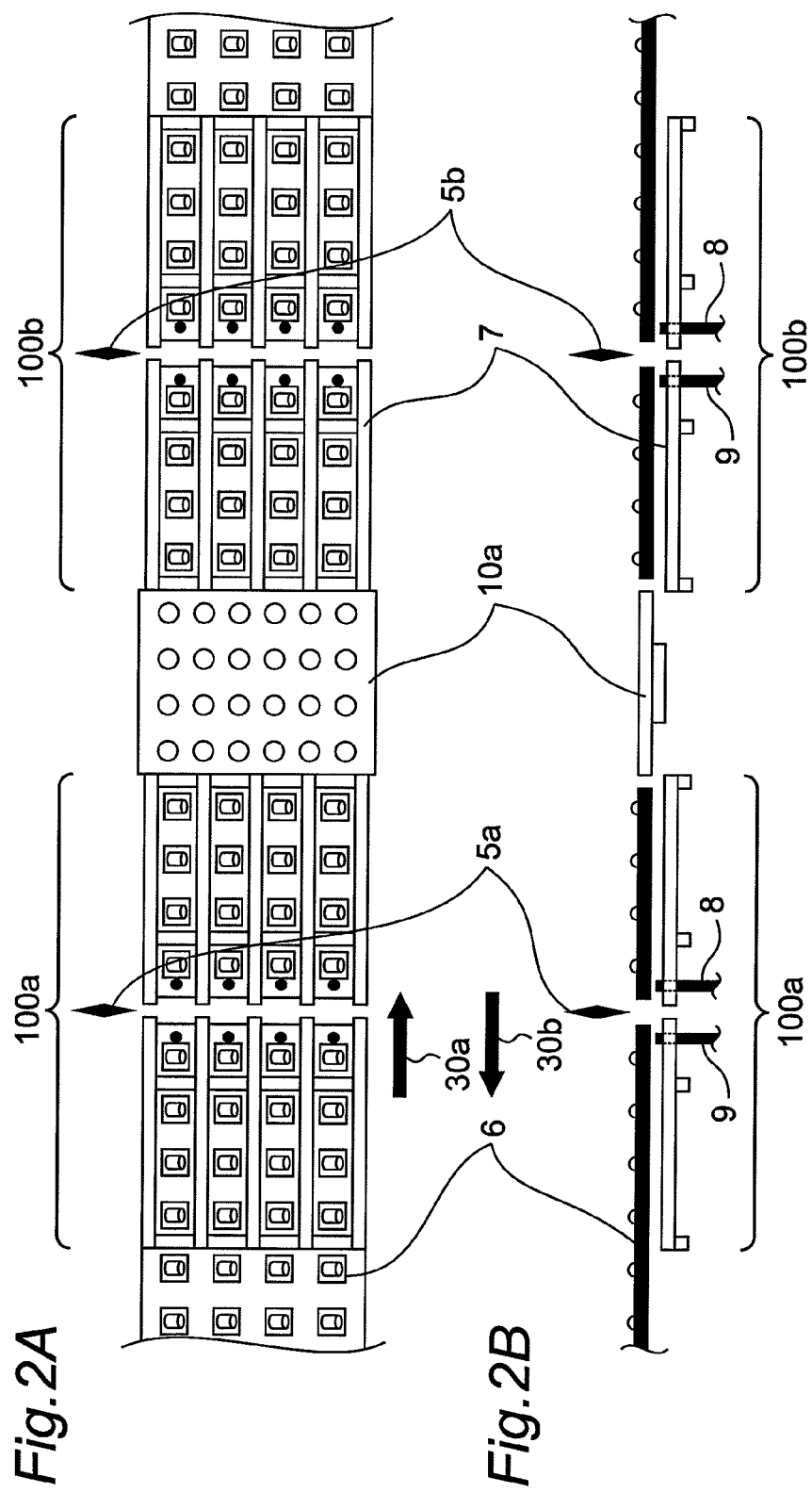

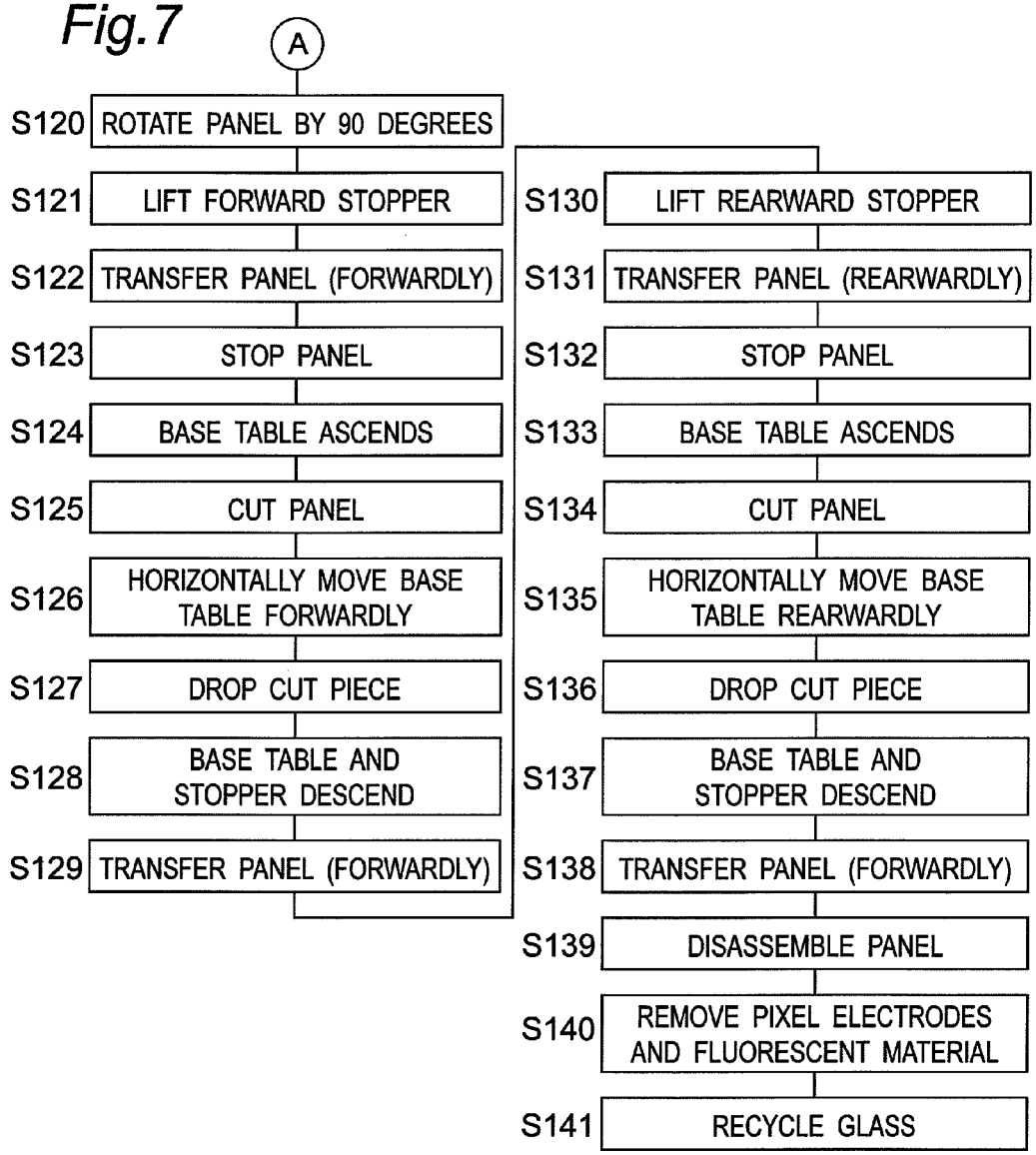
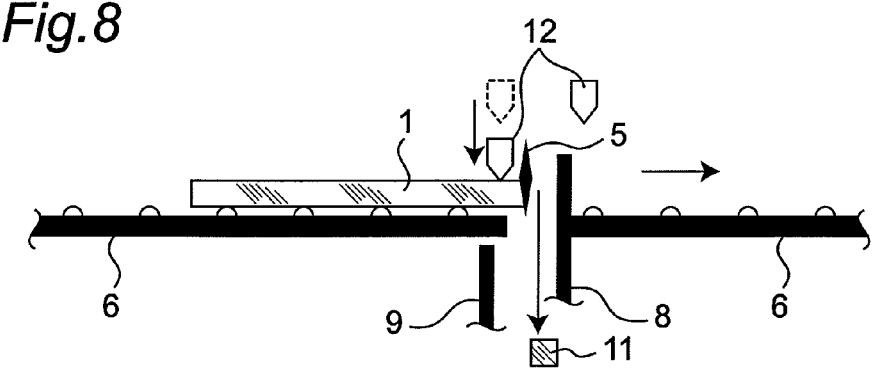

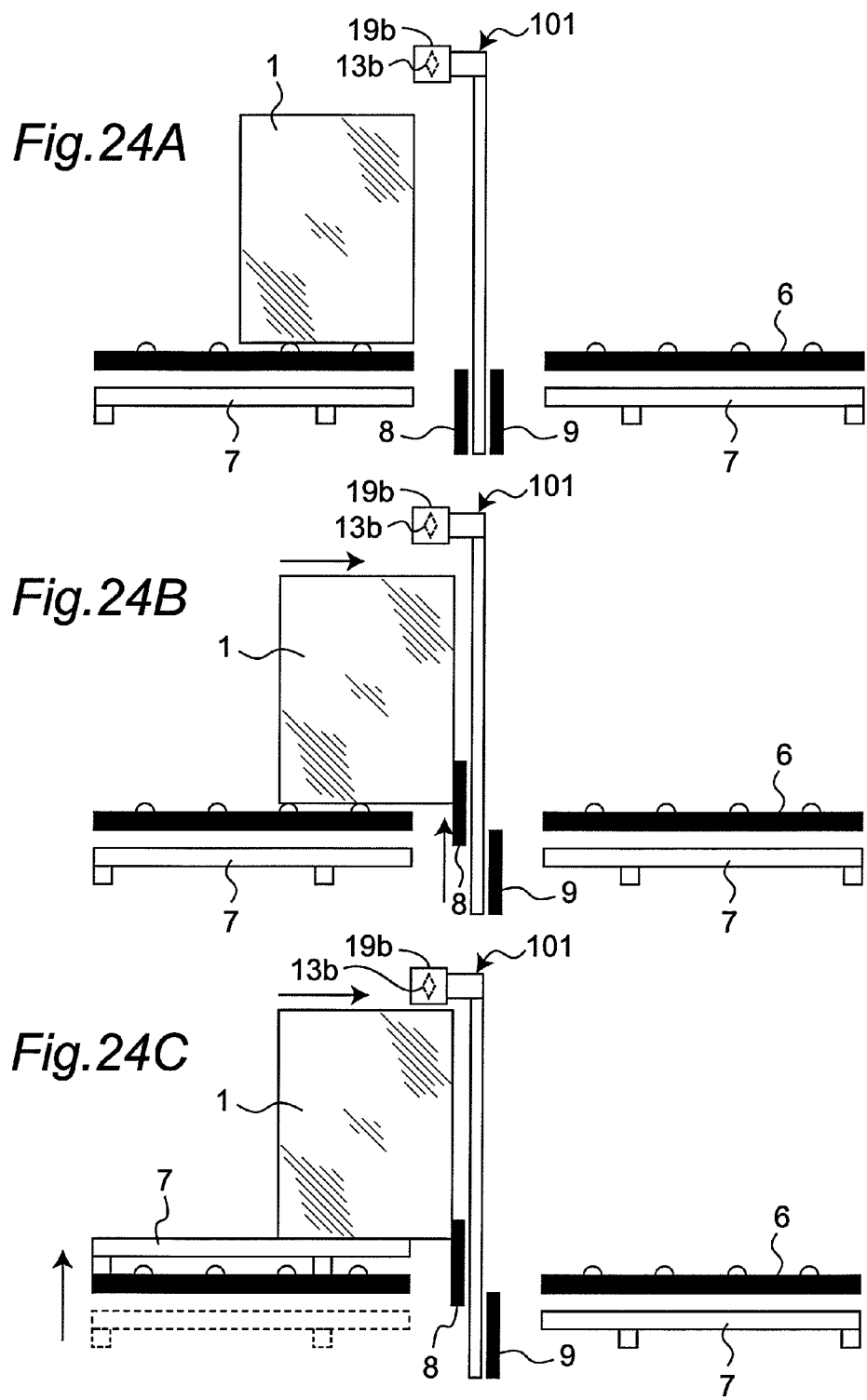

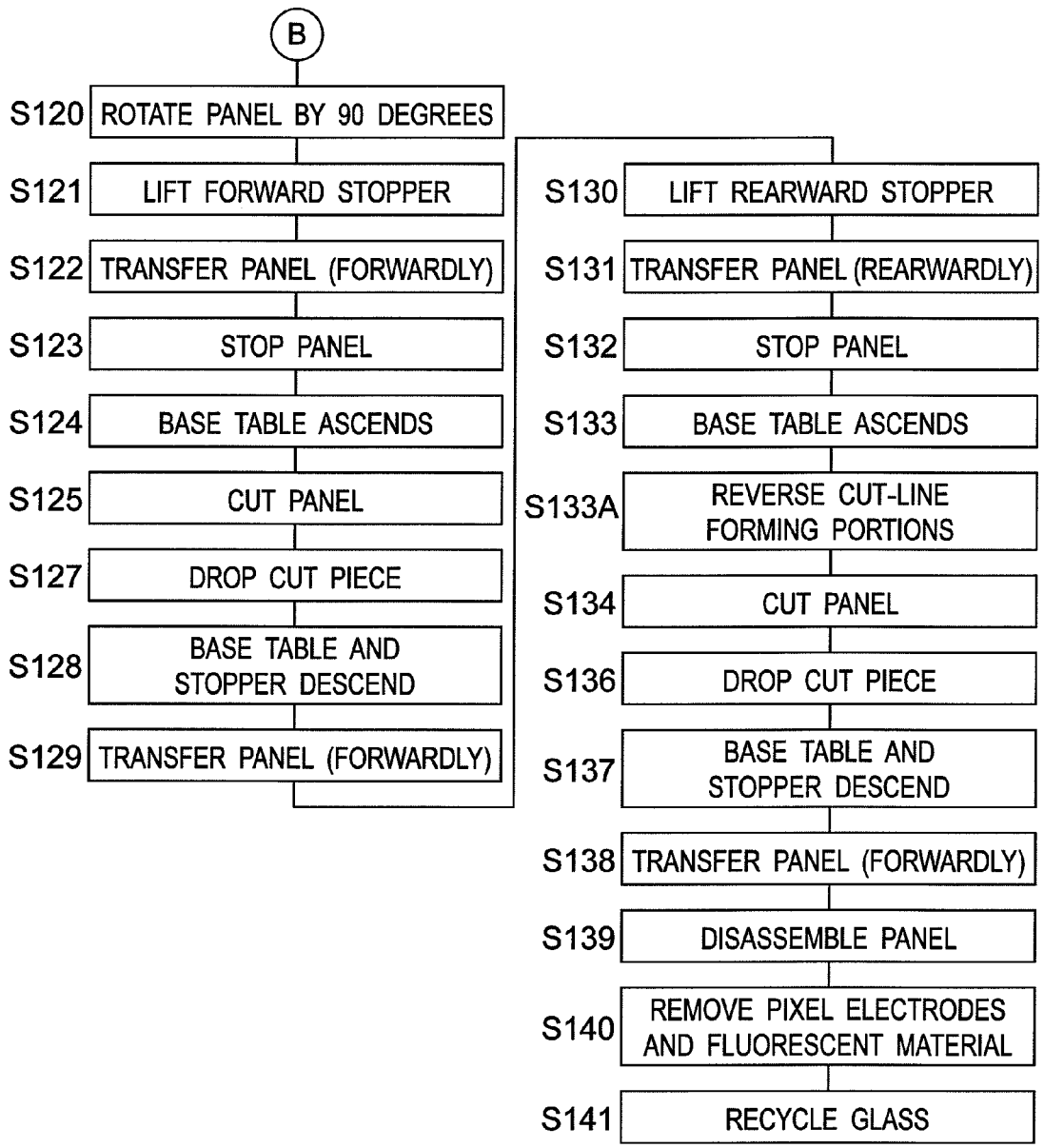

GLASS CUTTING APPARATUS, GLASS-SUBSTRATE DISASSEMBLING APPARATUS, GLASS-SUBSTRATE DISASSEMBLING SYSTEM, GLASS CUTTING METHOD, AND GLASS-SUBSTRATE DISASSEMBLING METHOD

TECHNICAL FIELD

The present invention relates to a glass cutting apparatus and a glass cutting method for cutting a glass plate, and also relates to a glass-substrate disassembling apparatus, a glass-substrate disassembling system and a glass-substrate disassembling method which use the glass cutting apparatus. More specifically, the present invention relates to a glass cutting apparatus and a glass cutting method for cutting a laminated glass constituting a display panel, which is configured by two glass flat plates attached to each other with a spacing provided therebetween, to recycle the display panel, and also relates to a glass-substrate disassembling apparatus, a glass-substrate disassembling system and a glass-substrate disassembling method for disassembling the laminated glass into the respective glass flat plates using the glass cutting apparatus.

BACKGROUND ART

In recent years, attention has been focused on plasma display panels and liquid crystal display panels, as display devices suitable for reduction in thickness and upsizing. These display panels (hereinafter, referred to as "panels") are constituted by two flat-plate shaped glass substrates attached to each other through a bonding material with a desired spacing provided therebetween, wherein these glass substrates have display element components such as electrodes, dielectric materials, ribs, light emission components and color filters which are held thereon.

On the other hand, conventionally, defective components created during panel fabrication processing and sold panels which have been used have been subjected to disposal processing such as landfills. However, regeneration and reuse of panels have been social challenges, due to an increase of public opinions for global environmental protection, such as effective utilization, regeneration, reuse and saving of resources, as well as a lack of landfill grounds.

In view of the aforementioned circumstances, there have been increasingly stepped up developments for reuse of glass plates, which are main components of panels. In order to reuse glass plates, it is necessary to cut the attached portions of the glass plates attached to each other for separating the two glass plates from each other, in order to remove the display element components on the glass plates. At present, such disassembling operations have been manually performed using tools such as glass cutting cutters or vibration cutters. Further, there are techniques for cutting glass plates, as disclosed in the following Patent Documents.

Patent Document 1: Japanese Unexamined Patent Publication No. 2002-050295
Patent Document 2: Japanese Unexamined Patent Publication No. 6-48755
Patent Document 3: Japanese Unexamined Patent Publication No. 2001-302264

DISCLOSURE OF THE INVENTION

Problems to be Solved by the Invention

The aforementioned conventional methods require an operator to manually disassemble a panel into two glass flat plates using tools in processing for disassembling the panel into the glass substrates, and these disassembling operations involve large burdens. This has resulted in prominently poor efficiency.

The present invention was made in view of the aforementioned problem and aims at providing a glass cutting apparatus, a glass-substrate disassembling apparatus, a glass-substrate disassembling system, a glass cutting method and a glass-substrate disassembling method for disassembling a display panel into two glass flat plates with higher efficiency.

Means for Solving the Problems

A glass cutting apparatus according to the present invention includes a pair of cutters installed oppositely to each other to sandwich, therebetween, a glass plate with surfaces of the glass plate thereof being along a vertical direction; a first pressing unit that presses one of the cutters to one of the surfaces of the glass plate in a horizontal direction with a pressing force P; a second pressing unit that is placed oppositely to the first pressing unit and presses the other one of the cutters to the other surface of the glass plate in the horizontal direction with the pressing force P; and a moving unit that moves the pair of cutters pressing the glass plate with the pressing force P.

A glass-substrate disassembling apparatus according to the present invention is a display panel glass-substrate disassembling apparatus for disassembling a display panel constituted by two glass substrates bonded to each other at peripheral portions thereof to recycle the display panel and includes: a transfer unit capable of transferring the display panel in forward and rearward directions; a stopping unit that stops the display panel being transferred at a predetermined stop position; a fixing unit that fixes, at the stop position, the display panel stopped at the stop position; and a cutting unit comprising the aforementioned glass cutting apparatus for cutting at least a single side of the display panel fixed by the fixing unit.

A glass-substrate disassembling system according to the present invention is a display panel glass-substrate disassembling system for disassembling a display panel constituted by two glass substrates bonded to each other at peripheral portions thereof to recycle the display panel and includes: a first glass-substrate disassembling apparatus including the aforementioned glass-substrate disassembling apparatus; a rotation unit that rotates the display panel by 90 degrees about an axis perpendicular to the display panel; and a second glass-substrate disassembling apparatus including the aforementioned glass-substrate disassembling apparatus; wherein the rotation unit is placed downstream of the first glass-substrate disassembling apparatus in the forward direction and upstream of the second glass-substrate disassembling apparatus in the forward direction.

A glass cutting method according to the present invention includes the steps of: holding a glass plate with surfaces of the glass plate being along a vertical direction; pressing, to the glass surfaces, a pair of cutters installed oppositely to each other in a horizontal direction with the glass plate sandwiched therebetween, with pressing forces equal to each other; and moving the pair of cutters and the glass plate relatively to each other to form a pair of cut lines on the glass plate.

A first glass-substrate disassembling method according to the present invention is a display panel glass-substrate disassembling method for disassembling a display panel constituted by two glass substrates bonded to each other at peripheral portions thereof through a sealing adhesive agent to recycle the display panel and includes the steps of: stopping the display panel being transferred in a forward direction at a first stop position; fixing, at the first stop position, the display panel stopped at the first stop position; and cutting at least a single side of the display panel fixed at the first stop position using the aforementioned glass cutting method.

A second glass-substrate disassembling method according to the present invention is a display panel glass-substrate disassembling method for disassembling a display panel constituted by two glass substrates bonded to each other at peripheral portions thereof through a sealing adhesive agent to recycle the display panel and includes the steps of: stopping the display panel being transferred in a forward direction at a first stop position; fixing, at the first stop position, the display panel stopped at the first stop position; cutting at least a single side of the display panel fixed at the first stop position, using the aforementioned method; transferring the display panel in a rearward direction; stopping the display panel at a second stop position; fixing, at a second stop position, the display panel stopped at the second stop position; cutting at least a single side of the display panel fixed at the second stop position, using the aforementioned method; transferring the display panel in the forward direction; rotating, by 90 degrees, the display panel about an axis perpendicular to the panel; transferring the rotated display panel in the forward direction; stopping the display panel being transferred in the forward direction at a third stop position; fixing, at the third stop position, the display panel stopped at the third stop position; cutting at least a single side of the display panel fixed at the third stop position, using the aforementioned method; transferring the display panel in the rearward direction; stopping the display panel at a fourth stop position; fixing, at the fourth stop position, the display panel stopped at the fourth stop position; and cutting at least a single side of the display panel fixed at the fourth stop position, using the aforementioned method.

Effects of the Invention

According to the present invention, cut lines are formed in opposite surfaces of a glass with a pair of cutters installed oppositely to each other in a horizontal direction, which enables cutting a laminated glass or a hollow glass with a larger plate thickness, in a short period of time, without inducing flaws caused by horizontal cracks and chips in the cut surfaces, thereby offering an advantage of a possibility of disassembling a panel into two glass flat plates with a simple method and an inexpensive apparatus with higher efficiency.

BRIEF DESCRIPTION OF THE DRAWINGS

FIG. 2A is a schematic structural plan view of a glass-substrate disassembling apparatus according to a first embodiment of the present invention, and FIG. 2B is a schematic structural front view of the glass-substrate disassembling apparatus according to the first embodiment of the present invention.

FIG. 7 is a flow chart illustrating the operations and the disassembling method with the glass-substrate disassembling apparatus according to the first embodiment of the present invention.

FIG. 8 is an exemplary modification of a fixing unit in the glass-substrate disassembling apparatus according to the first embodiment of the present invention.

FIGS. 24A to 24C are operation explanatory views illustrating operations and a disassembling method with the glass-substrate disassembling apparatus according to the fourth embodiment of the present invention.

FIG. 27 is a flow chart illustrating the operations and the disassembling method with the glass-substrate disassembling apparatus according to the fourth embodiment of the present invention.

DESCRIPTION OF REFERENCE SYMBOLS

Figure 1A:
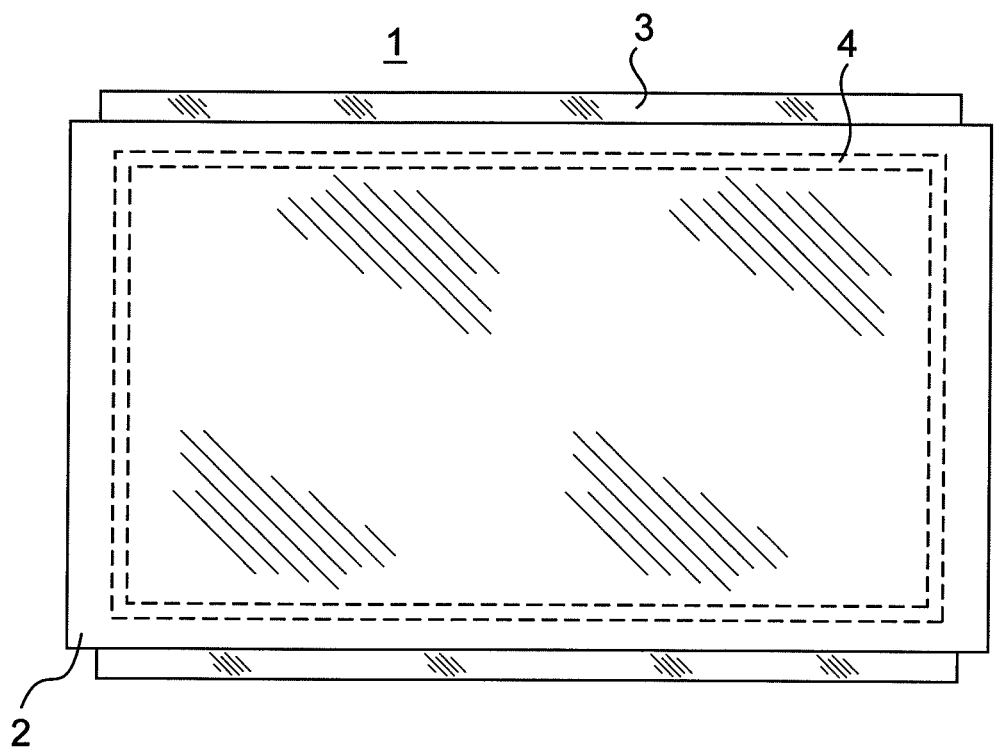
FIG. 1A is a schematic structural plan view of a plasma display panel.

1: Laminated glass (plasma display panel)
2: First glass flat plate
3: Second glass flat plate
4: Bonding material
5a: Diamond wheel cutter (first cutting unit)
5b: Diamond wheel cutter (second cutting unit)
6: Transfer unit
7: Glass-plate holding unit (fixing unit)
8: Forward stopper (first stopping unit)
9: Rearward stopper (second stopping unit)
10a: Rotation unit
10b: Rotation unit
10c: Rotation unit
11: Cut piece
11b: Split piece
12: Panel pressing unit
13a: First wheel cutter
13b: Second wheel cutter
14a: First pressing unit
14b: Second pressing unit
15: Vibration unit
16: Cut line
17: Vertical crack
18: Pressing member
19a: First cut-line forming portion
19b: Second cut-line forming portion
20: Moving device
20b: Moving device
21: Supporting arm portion
22: Air-intake pipe
23: Air-exhaust pipe
24: Pressing control device
25: Ball screw
26: Slide guide
27: Operating portion
28: Driving motor
29: Frame
30: Timing belt
100a: First glass-substrate disassembling apparatus
100b: Second glass-substrate disassembling apparatus
101: Glass cutting apparatus

BEST MODE FOR CARRYING OUT THE INVENTION

Hereinafter, embodiments of the present invention will be described, with reference to the drawings. Further, in the figures, like reference numerals designate the same or corresponding components. In the following embodiments, there will be described a glass cutting apparatus and the like which enable disassembling a display panel into two glass flat plates with high efficiency, in such a way as to improve operation safety for operators.

First Embodiment

In the present embodiment, there will be described a glass-substrate disassembling system, by exemplifying a plasma display panel as an object to be processed.

Figure 1B:
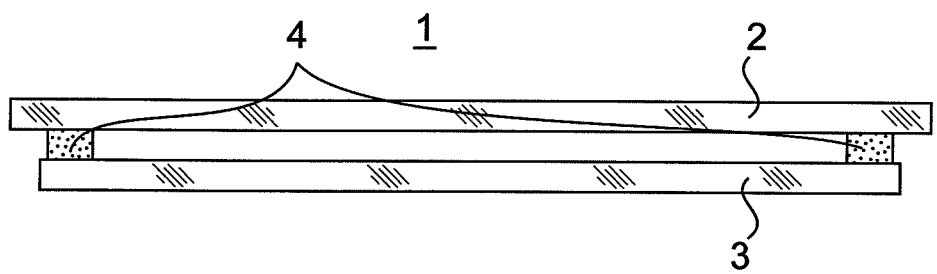
FIG. 1B is a schematic structural front view of the plasma display panel.

FIGS. 1A and 1B are schematic views of the structure of a plasma display panel 1 (hereinafter, referred to as a "panel 1"). FIG. 1A is a plan view of the panel 1, and FIG. 1B is a front view of the panel 1. The panel 1 includes a first glass flat plate 2 which is provided with pixel electrodes and is placed at the front surface, and a second glass flat plate 3 which is provided with pixel electrodes, further coated with a fluorescent material and is placed at the back surface. These glass flat plates 2 and 3 are attached to each other in a sealing manner through a bonding member 4 as a coupling member, at a state where a discharge gas is enclosed at a predetermined pressure within the space closed by the flat plates 2 and 3 and the bonding member 4. The bonding member 4 is applied to the glass flat plates 2 and 3, at their portions which are more inner than the peripheries of the glass flat plates 2 and 3 by a predetermined distance, over a predetermined width substantially parallel to sides of the panel 1.

FIG. 2 is a schematic view of the structure of the panel glass-substrate disassembling system according to the first embodiment of the present invention for use in processing to recycle the panel 1. FIG. 2A is a plan view of the present disassembling system, and FIG. 2B is a front view of the present disassembling system.

As illustrated in FIGS. 2A and 2B, the present glass-substrate disassembling system includes a first glass-substrate disassembling apparatus 100a (referred to as a "first disassembling apparatus"), a second glass-substrate disassembling apparatus 100b (referred to as a "second disassembling apparatus"), and a rotation unit 10a positioned therebetween. The first and second disassembling apparatuses 100a and 100b include diamond wheel cutters 5a and 5b (hereinafter, referred to as "cutters") as a cutting unit 5 for cutting the panel 1 at predetermined portions. The cutter 5a (namely, a first cutting unit) in the first disassembling apparatus 100a and the cutter 5b (namely, a second cutting unit) in the second disassembling apparatus 100b can be cutters having the same functions, but they are desirably structured to cut different lengths in the panel 1. This is because the lengths of the sides of the panel 1 cut by the cutter 5a are different from the lengths of the sides of the panel 1 cut by the cutter 5b. In the present specification, in cases where there is no need for particularly distinguishing the cutter 5a and the cutter 5b, the cutters 5a and 5b are comprehensively referred to as cutters 5.

Further, the first and second disassembling apparatuses 100a and 100b include a transfer unit 6 for transferring the panel 1 in two directions, which are a forward direction 30a and a rearward direction 30b, along a transfer path, thereby transferring the panel 1 in horizontal directions over the upper surface of the present disassembling apparatus. The panel 1 being transferred by the transfer unit 6 is temporarily stopped and fixed at predetermined positions, namely stop positions, when it is cut at predetermined portions by the cutters 5a and 5b. In order to fix the panel 1, the present apparatus includes a forward stopper 8 (namely, a first stopping unit) and a rearward stopper 9 (namely, a second stopping unit) as a unit for stopping the panel, and a base table as a glass-plate holding unit 7 (namely, a fixing unit) for fixing the panel. The operations of both the stoppers 8 and 9 and the glass-plate holding unit 7 will be later described in detail. The forward and rearward stoppers 8 and 9 are moved upwardly through holes provided in the transfer unit 6, so that their upper end portions are protruded upwardly beyond the transfer unit 6 and come into contact with the panel 1 being transferred. The forward and rearward stoppers 8 and 9 are rod-shaped members having rigidity enough not to deform on receiving impulses from the panel 1 at the time of the contact. Although there are illustrated only the upper end portions of the forward and rearward stoppers 8 and 9 in the figure, the forward and rearward stoppers 8 and 9 extend downwardly and are held at their lower portions which are not illustrated such that they are movable upwardly and downwardly.

The glass-plate holding unit 7 is constituted by a plurality of members placed in interstices in the transfer unit 6 and elongated in the direction of transfer of the panel 1, and members coupling these plurality of members. The glass-plate holding unit 7 is held, such that it is movable upwardly and downwardly through the interstices in the transfer unit 6. The glass-plate holding unit 7 can be moved upward to a height where an upper end portion thereof protrudes beyond the transfer unit 6. The glass-plate holding unit 7 can be made of any material having rigidity capable of holding the panel 1 without deforming.

In the figure, the rotation unit 10a is placed at a center portion of the transfer path for the panel 1, namely downstream of the first disassembling apparatus 100a in the forward direction and upstream of the second disassembling apparatus 100b in the forward direction. The rotation unit 10a is for rotating, by 90 degrees, the orientation of the panel 1 transferred thereto by the transfer unit 6 in the horizontal direction. The rotation unit 10a includes, for example, a plurality of spherical-shaped free rollers and rotates the orientation of the panel 1 by 90 degrees about an axis perpendicular to the panel 1 while holding the panel 1 with the upper surface of the rotation unit 10a. This enables cutting the uncut two sides of the panel 1 with the cutter 5b in the second disassembling apparatus 100b placed on the subsequent transfer path.

Hereinafter, with reference to schematic views in FIGS. 3 to 5 and flow charts illustrated in FIGS. 6 and 7, there will be described operations of the glass-substrate disassembling system according to the present embodiment.

Figure 3A:
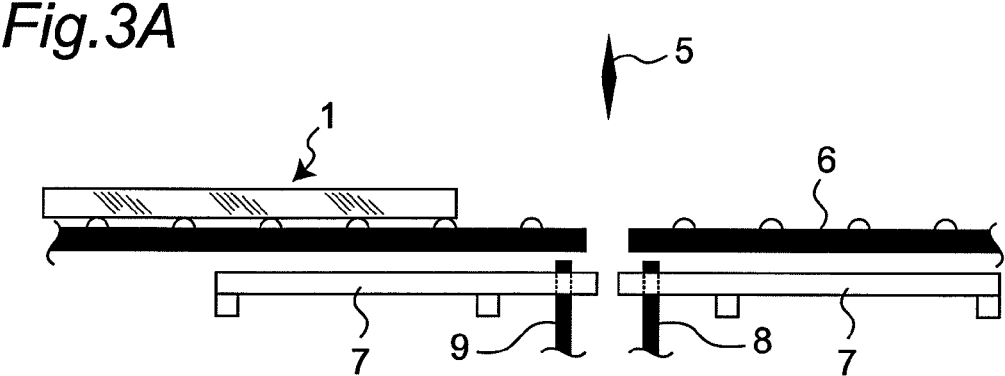
FIGS. 3A to 3C are operation explanatory views illustrating operations and a disassembling method with the glass-substrate disassembling apparatus according to the first embodiment of the present invention.
Figure 6:
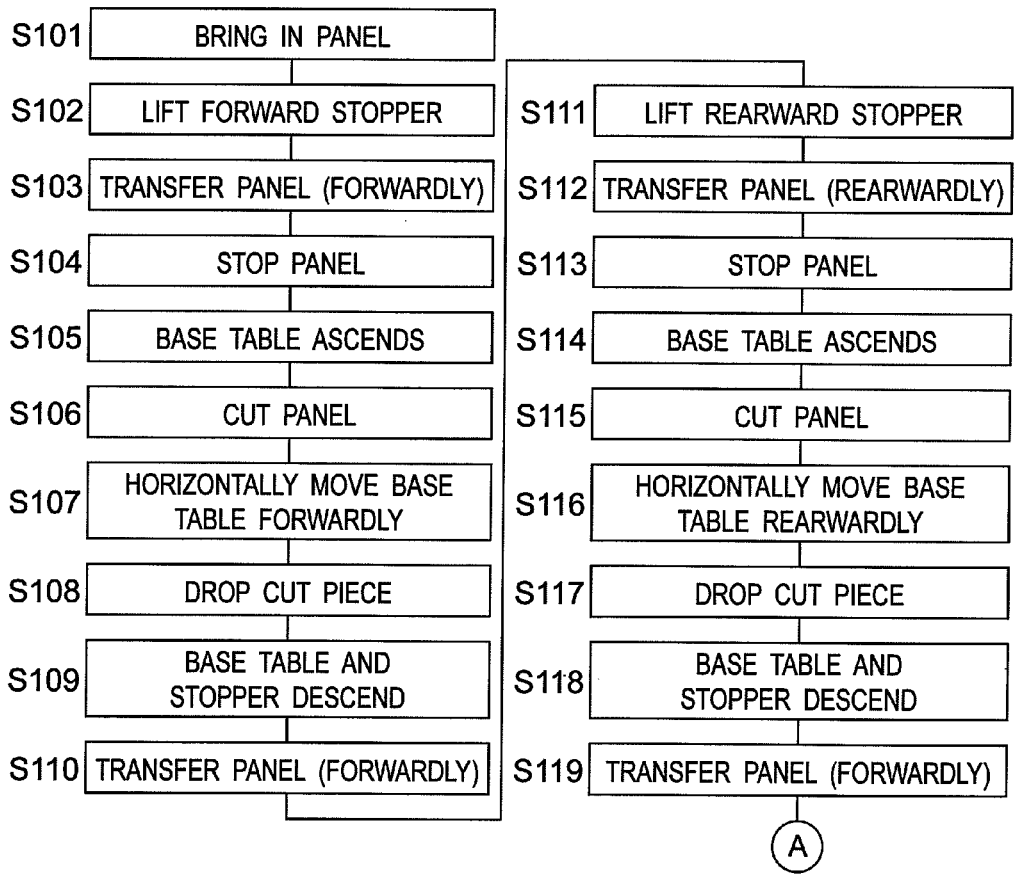
FIG. 6 is a flow chart illustrating the operations and the disassembling method with the glass-substrate disassembling apparatus according to the first embodiment of the present invention.

Referring to FIG. 3A, if the panel 1 is brought in and placed on the transfer unit 6 in the present apparatus, the transfer unit 6 transfers the panel 1 in the forward direction (step S101 in FIG. 6). In this case, the term "forward direction" refers to the rightward direction in the figure, while the term "rearward direction" refers to the leftward direction in the figure.

Figure 3B:
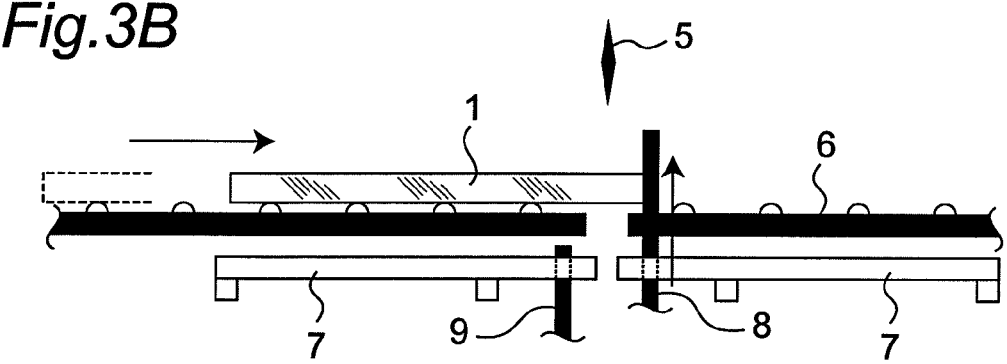

Next, the forward stopper 8 in the present apparatus is lifted to take an attitude capable of coming into contact with the panel 1 being transferred in the forward direction, namely a contact attitude. Namely, if the panel 1 is transferred, before the frontmost portion of the panel 1 passes above the forward stopper 8, the forward stopper 8 is lifted to take the contact attitude (step S102 in FIG. 6). In this state, the panel 1 is further transferred in the forward direction (step S103 in FIG. 6), then comes into contact with the forward stopper 8 as illustrated in FIG. 3B and stops at this position, namely a first stop position (step S104 in FIG. 6).

Figure 3C:
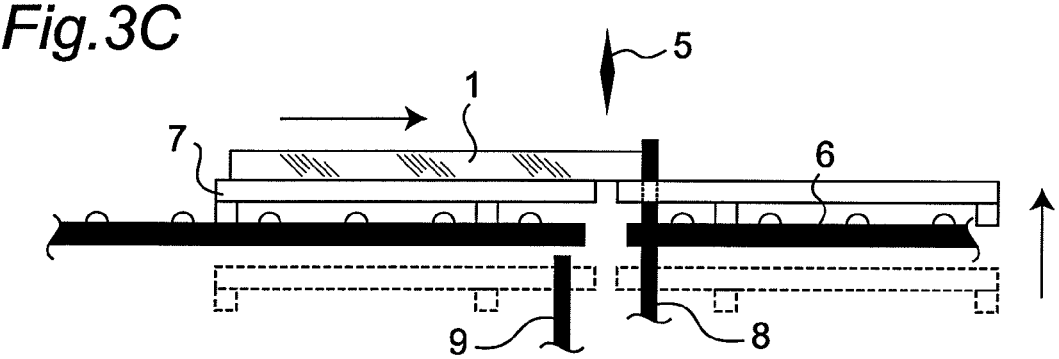

After the panel 1 is stopped by the forward stopper 8, the base table as the glass-plate holding unit 7 starts ascending (step S105 in FIG. 6). As illustrated in FIG. 3C, since the glass-plate holding unit 7 ascends, the panel 1 separates from the transfer unit 6 and is secured to the glass-plate holding unit 7 due to its own weight, at a state where its frontmost portion is kept in contact with the forward stopper 8.

Figure 4A:
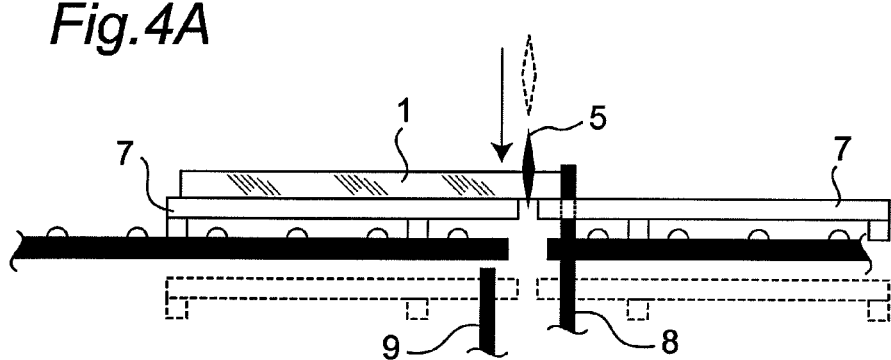
FIGS. 4A to 4C are operation explanatory views illustrating the operations and the disassembling method with the glass-substrate disassembling apparatus according to the first embodiment of the present invention.

Next, as illustrated in FIG. 4A, a frontmost single side of the panel 1 is cut by the cutters 5 as the cutting unit 5 (step S106 in FIG. 6). The portion of the panel 1 to be cut is determined by the interval between the cutters 5 and the forward stopper 8. In this case, the interval is set, such that the panel is cut at an inner portion with respect to the bonding member 4 (see FIGS. 1A and 1B) coupling the first glass flat plate 2 and the second glass flat plate 3 to one another.

Figure 4B:
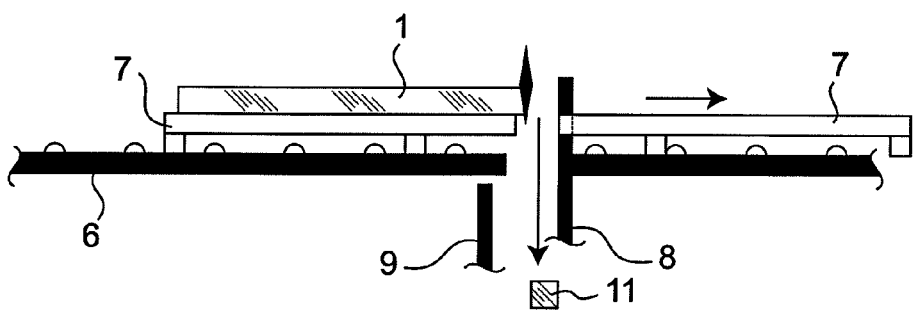

After the completion of the cutting of the single side of the panel 1, the glass-plate holding unit 7 holding the cut single side of the panel 1 is moved horizontally in the forward direction (step S107 in FIG. 6). As illustrated in FIG. 4B, since the movement of the panel 1 is restricted by the forward stopper 8 in the forward direction, even when the glass-plate holding unit 7 is moved in the forward direction, the panel 1 is prevented from moving together therewith, so that a cut piece 11 loses the foothold and falls downward (step S108 in FIG. 6).

Thereafter, the glass-plate holding unit 7 and the forward stopper 8 descend below the transfer unit 6 to take a state capable of further transferring the panel 1, namely an open attitude (step S109 in FIG. 6), and the panel 1 is further transferred in the forward direction (step S110 in FIG. 6).

Figure 4C:
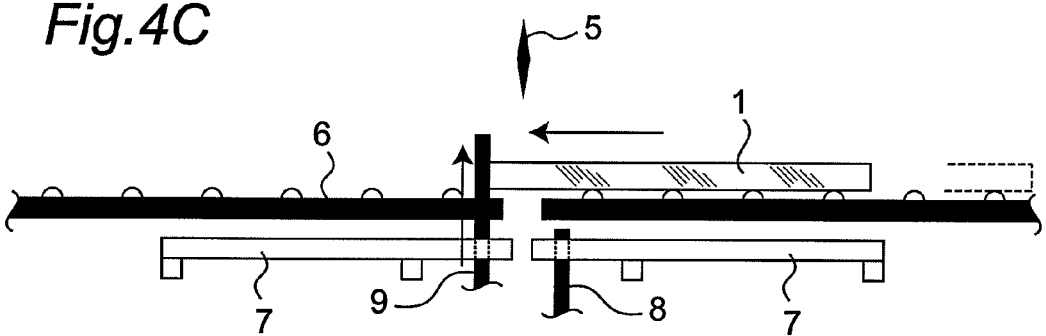

Since the panel 1 is transferred in the forward direction, the rearmost portion of the panel 1 passes above the rearward stopper 9 and, thereafter, the rearward stopper 9 is lifted to take an attitude in which its upper end portion is protruded upwardly beyond the transfer unit 6, namely a contact attitude (step S111 in FIG. 6). Next, the direction of transfer by the transfer unit 6 is reversed for transferring the panel 1 in the rearward direction (step S112 in FIG. 6). The panel 1 transferred in the rearward direction comes into contact with the rearward stopper 9 which has been lifted as illustrated in FIG. 4C and stops at this position, namely a second stop position (step S113 in FIG. 6).

After the panel 1 is stopped by the rearward stopper 9, similarly to the aforementioned step S105 (FIG. 6), the glass-plate holding unit 7 starts ascending (step S114 in FIG. 6), which separates the panel 1 from the transfer unit 6 and secures the panel 1 to the base table 7 at a state where the rearmost portion of the panel 1 is kept in contact with the rearward stopper 9. Similarly to the aforementioned step S106, the rearmost single side of the panel 1 is cut by the cutters 5 as the cutting unit (step S115 in FIG. 6). In this step, similarly, the panel 1 is cut at an inner portion with respect to the bonding member 4 (see FIGS. 1A and 1B) applied to the rearmost single side of the panel 1.

Similarly to the aforementioned steps S107 to S110, the glass-plate holding unit 7 holding the cut single side of the panel 1 is moved horizontally in the rearward direction (step S116 in FIG. 6) so that the cut piece falls downwardly (step S117 in FIG. 6), and, then, the base table 7 and the rearward stopper 9 descend below the transfer unit 6, thereby taking an open attitude (step S118 in FIG. 6). Then, the panel 1 is transferred in the forward direction (step S119 in FIG. 6).

Next, the panel 1 is transferred to the rotation unit 10a. The panel 1 transferred thereto is rotated in the horizontal direction by 90 degrees through the plurality of free rollers placed on the upper surface of the rotation unit 10a (step S120 in FIG. 7), as illustrated in FIG. 5. Due to this rotation, the cut sides of the panel 1 become parallel to the direction of transfer, while the uncut two sides of the panel 1 appear at the front and rear sides in the direction of transfer. After the completion of the rotation, the rotation unit 10a transfers the panel 1 in the forward direction and, subsequently, the transfer unit 6 starts transferring the panel 1 in the forward direction.

Thereafter, similarly to steps S102 to S119, the uncut two sides of the panel 1 are cut at inner portions with respect to the bonding member 4 (FIG. 1), at a state where the panel 1 is fixed at stop positions, namely a third stop position and a fourth stop position (steps S121 to S138 in FIG. 7). However, the length of the sides of the panel 1 which should be cut in steps S125 and S134, in general, is different from the length of the sides of the panel 1 which have been cut in steps S106 and S115. Therefore, the glass cutting apparatus 100b used in steps S125 and S134 is structured to be suitable for cutting the panel 1 by a length different from the length by which the panel 1 is cut by the glass cutting apparatus 100a used in steps S106 and S115.

The first glass flat plate 2 (FIG. 1) and the second glass flat plate 3 (FIG. 1) in the panel 1 which has been cut at portions coated with the bonding member 4 (FIG. 1) in the aforementioned steps are brought into a state where there is no member bonding them to each other. An operator disassembles the panel 1 at this state into the glass flat plates 2 and 3 (step S139 in FIG. 7), then removes the pixel electrodes and the fluorescent material applied thereto (step S140 in FIG. 7) and then transfers both the flat plates 2 and 3 into glass recycling processing to recycle the glass (step S141 in FIG. 7).

In the present embodiment, the cutting unit 5 is constituted by the diamond wheel cutters 5. Alternately, the cutting unit 5 can be constituted by, for example, vibration blades, energized wires, a water jet and sandblasting which are types of jet processing, laser cutting, and the like.

In the present embodiment, the glass-plate holding unit 7 is constituted by the base table 7 which holds the panel 1 thereon. Alternately, the glass-plate holding unit can be a panel pressing unit 12 for pressing the panel 1 from thereabove, as illustrated in FIG. 8. By employing such panel pressing unit 12 as the glass-plate holding unit, it is possible to eliminate the necessity of steps S107, S116, S126 and S135 in FIGS. 6 and 7. The steps where the base table ascends (steps S105, S114, S124 and S133) should be replaced with steps where the panel pressing unit 12 descends. Further, the steps where the base table and the stoppers descend (the steps S109, S118, S128 and S137) should be replaced with steps where the panel pressing unit ascends and the stoppers descend.

Figure 5:
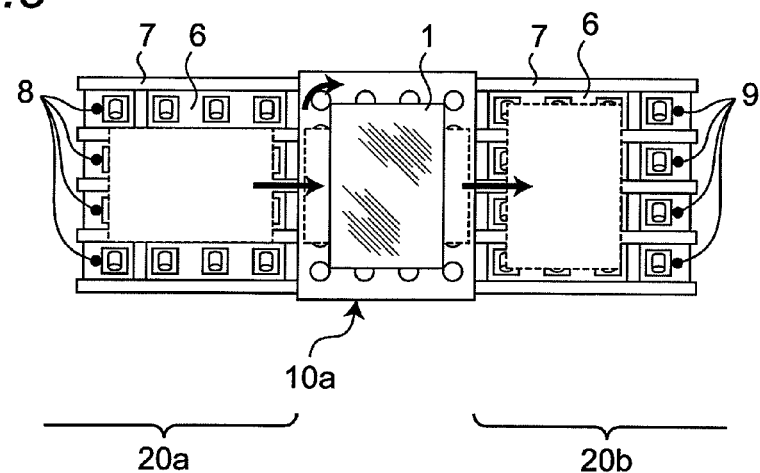
FIG. 5 is an operation explanatory view illustrating the operations and the disassembling method with the glass-substrate disassembling apparatus according to the first embodiment of the present invention.
Figure 9:
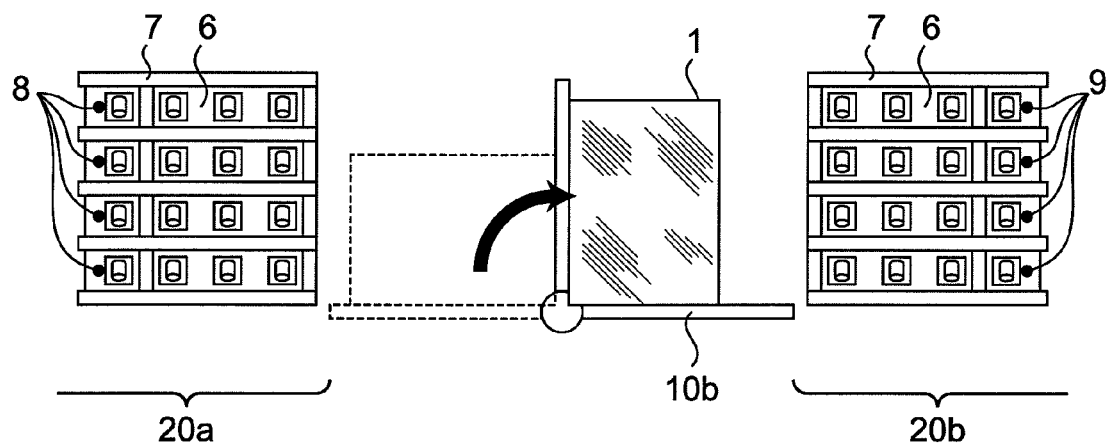
FIG. 9 is an exemplary modification of a panel rotation unit in the glass-substrate disassembling apparatus according to the first embodiment of the present invention.
Figure 10:
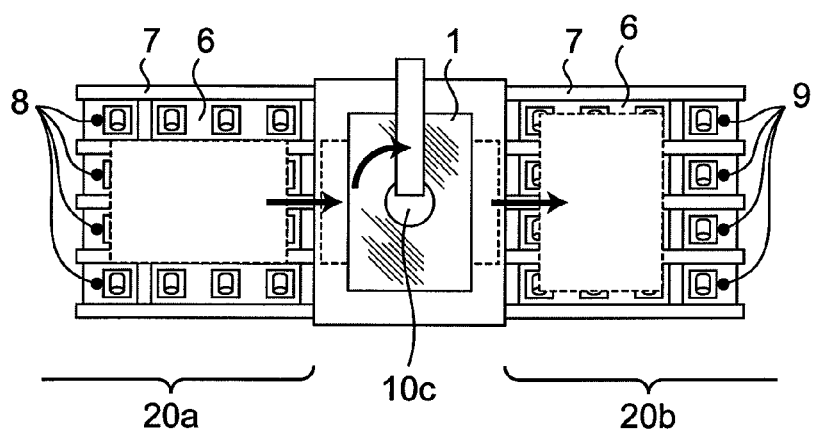
FIG. 10 is another exemplary modification of the panel rotation unit in the glass-substrate disassembling apparatus according to the first embodiment of the present invention.
Figure 11:
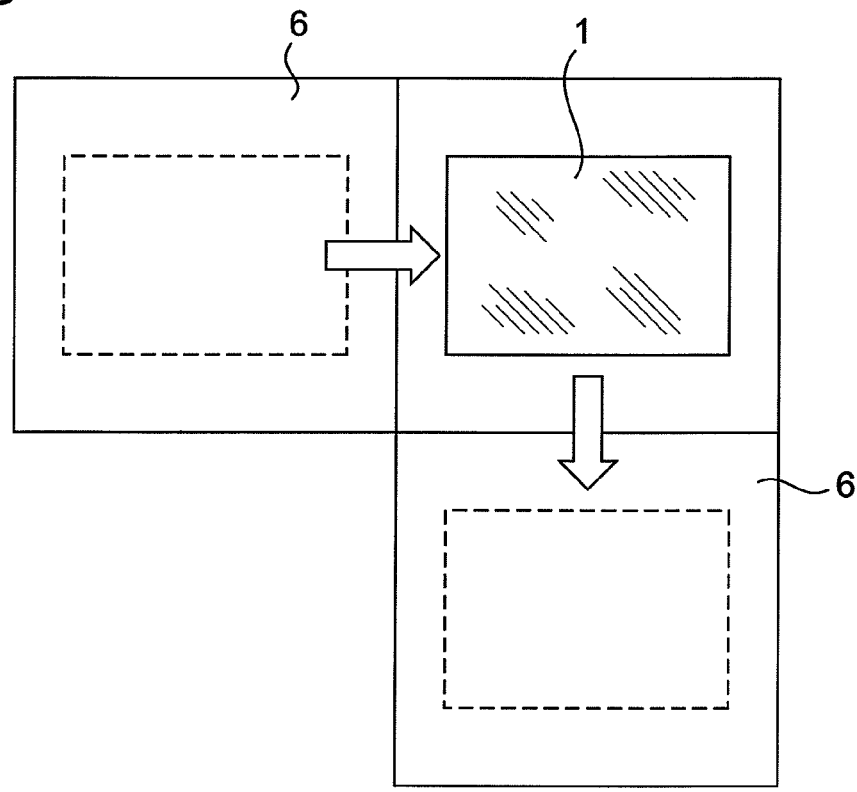
FIG. 11 is an exemplary modification of a panel transfer unit in the glass-substrate disassembling apparatus according to the first embodiment of the present invention.

In the present embodiment, a plurality of spherical-shaped free rollers as in FIGS. 2 and 5 are employed, as the unit for rotating the panel 1. Alternately, the unit for rotating the panel 1 can be constituted by a substantially-L-shaped component 10b which supports the panel 1 and is adapted to rotate the panel 1 when being rotated by 90 degrees, as illustrated in FIG. 9. Also, for example, the unit for rotating the panel 1 can be constituted by a rotation unit 10c which is adapted to rotate the panel 1 by 90 degrees while sucking the surface of the panel 1 as in FIG. 10. Also, it is possible to rotate, by 90 degrees, the panel 1 at a state where it is slightly floated, by providing a unit that ejects air to the lower surface of the panel 1.

Alternately, instead of providing the rotation unit, the transfer path in the present apparatus can be formed to have a substantially L shape for inclining, by 90 degrees, the direction of transfer for the panel 1, thereby offering similar effects to those offered by rotating the panel 1 by 90 degrees with respect to the direction of transfer. In this case, there is no need for providing the unit for rotating the panel 1.

Figure 12:
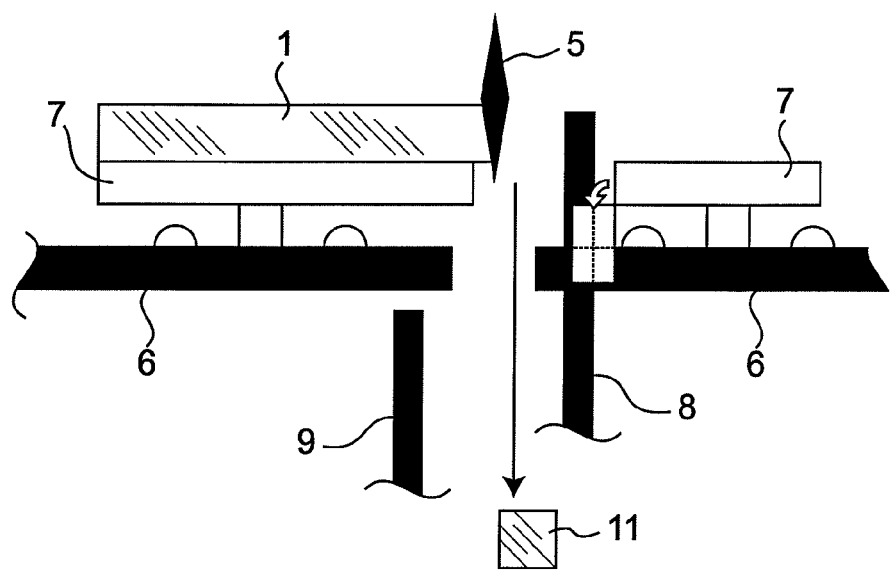
FIG. 12 is an operation explanatory view illustrating an exemplary modification of a cut-piece removing method, with the glass-substrate disassembling apparatus according to the first embodiment of the present invention.

In the present embodiment, the base table 7 holding the cut piece 11 is moved in the lateral direction for dropping the cut piece 11 (refer to steps S107 and S116 in FIG. 6 and steps S126 and S135 in FIG. 7). However, as the method for dropping the cut piece, instead of laterally moving the base table, it is possible to fold the portion of the base table 7 on which the cut piece 11 is placed, with respect to the base table 7, for dropping the cut piece 11, as in FIG. 12.

In the present embodiment, the plasma display panel 1 is employed as a laminated glass. However, the laminated glass is not limited to a plasma display panel and can be a liquid crystal display panel or a field emission display panel.

In the present embodiment, there have been described the structures and operations relating to glass flat-plate disassembling processing which is a part of processing to recycle a display panel including two glass flat plates opposing to each other. In the present embodiment, it is possible to stop the panel at predetermined positions by bringing it into contact with the stoppers. Further, at this state, it is possible to cut the panel, remove the cut piece, then rotate the panel and cut the other sides thereof similarly, thereby mechanically disassembling the panel into two glass flat plates. This can offer advantages of excellent safety for operators and a possibility of disassembling the panel into the first glass flat plate and the second glass flat plate with higher efficiency.

Second Embodiment

In the present embodiment, there will be described a glass cutting apparatus capable of splitting a laminated glass or a hollow glass with a larger plate thickness, in a short period of time, without inducing glass particles, flaws caused by horizontal cracks, and chips in the cut surfaces.

Figure 13:
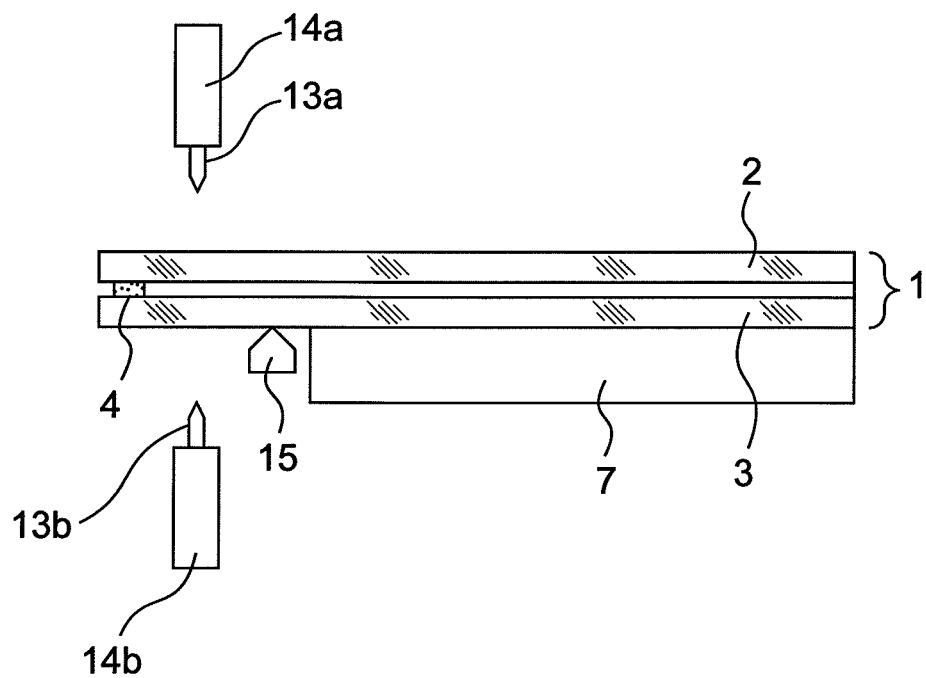
FIG. 13 is a schematic cross-sectional view illustrating an exemplary structure of a glass cutting apparatus according to a second embodiment of the present invention.

FIG. 13 is a schematic cross-sectional view illustrating main parts of an exemplary structure of the glass cutting apparatus according to the second embodiment of the present invention. FIGS. 14 to 17 are views illustrating a glass cutting method according to the present invention, by exemplifying a case of employing the glass cutting apparatus illustrated in FIG. 13.

Referring to FIG. 13, a laminated glass 1 is constituted by two glass flat plates 2 and 3 opposing to each other, and a bonding member 4 bonding these glass flat plates 2 and 3 to each other. The bonding member 4 is made of a flit glass, or an epoxy resin adhesive agent. The glass-plate holding unit 7 (namely, the fixing unit) is a flat table for fixing the laminated glass 1. A pair of wheel cutters 13a and 13b are cut-line forming units for writing cut lines on the surface and the back surface of the laminated glass 1 at the same time and are installed oppositely to each other. Pressing units 14a and 14b press the respective the cut-line forming units 13a and 13b against the laminated glass 1. A vibration unit 15 vibrates the laminated glass 1.

The glass material can be any generally well-known glass material such as soda-lime glass, clear glass, silica glass, non-alkali heat resistance glass or high-strain-point glass. The laminated glass 1 according to the present embodiment is a hollow glass constituted by the glass flat plates 2 and 3 bonded to each other through the bonding member 4 with a spacing interposed therebetween, as illustrated in FIG. 13, but it can be a laminated glass bonded over its entire surface through a bonding material with no gap provided therein. Among them, a hollow glass having a spacing with a size in the range of several micrometers to several hundreds micrometers, such as a display panel, is preferable, since sizes of glass particles or glass chips induced at the time of cutting it are several micrometers or less, which prevents the glass surfaces from being damaged by glass particles or glass chips.

The wheel cutters 13a and 13b can be any generally well-known wheel cutters, such as super hard alloy wheels or diamond wheels which are generally well known. Among them, super hard alloy wheels are preferable, since they are capable of creating uniform vertical cracks in glasses when they form cut lines therein.

The glass-plate holding unit 7 is for fixing the laminated glass 1 when it is being cut. When the laminated glass 1 can be fixed only through its own weight, the glass-plate holding unit 7 can be a flat table as illustrated in FIG. 13, for example. However, when the laminated glass 1 cannot be fixed only through its own weight, the laminated glass 1 is fixed by being sandwiched by pressing plates or a vise. Further, as a matter of cause, when the laminated glass 1 is fixed by being sandwiched, the laminated glass 1 can be fixed such that flat surfaces thereof are vertically placed.

The vibration unit 15 can be constituted by an electric vibrator, a pneumatic vibrator or a piezoelectric vibrator. The vibration conditions under which the laminated glass 1 is vibrated, such as the amplitude, the vibration frequency, the vibration intensity and the vibration time of the vibration unit 15, are varied according to the aspect of the laminated glass 1, the aspect of the cut lines and the like. Accordingly, the vibration unit 15 is provided with a vibration control unit, in order to change the vibration conditions. Next, there will be described an exemplary cutting method in a case where a laminated glass is employed.

Figure 14:
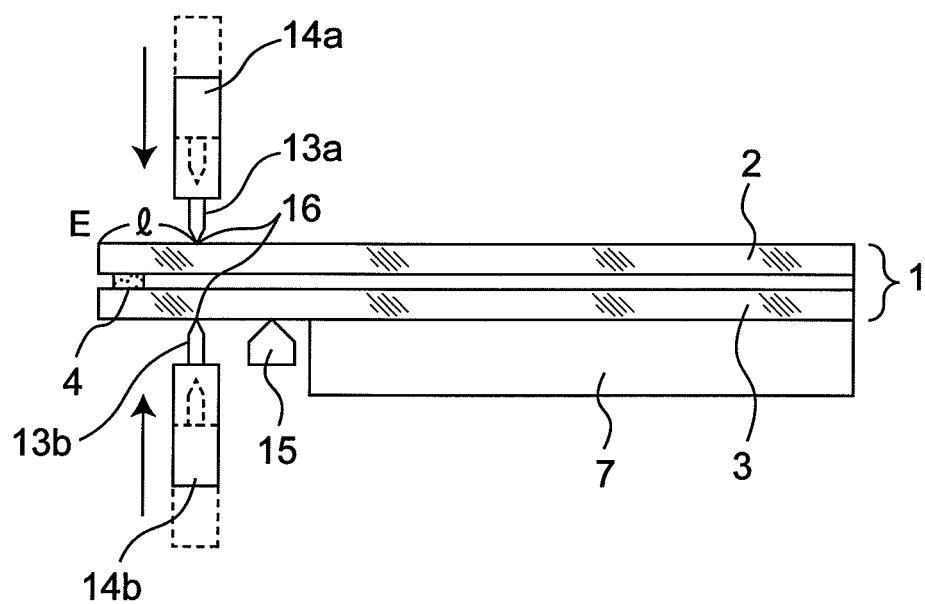
FIG. 14 is a schematic view illustrating an example of a glass cutting method according to the second embodiment of the present invention.

With reference to FIGS. 14 to 17, there will be described operations for cutting down the laminated glass 1 to which the bonding member 4 is bonded. As illustrated in FIG. 14, the laminated glass 1 is placed on the glass-plate holding unit 7, and the pair of wheel cutters 13a and 13b are brought into press-contact with the laminated glass 1 while being loaded by the pressing units 14a and 14b.

Figure 15A:
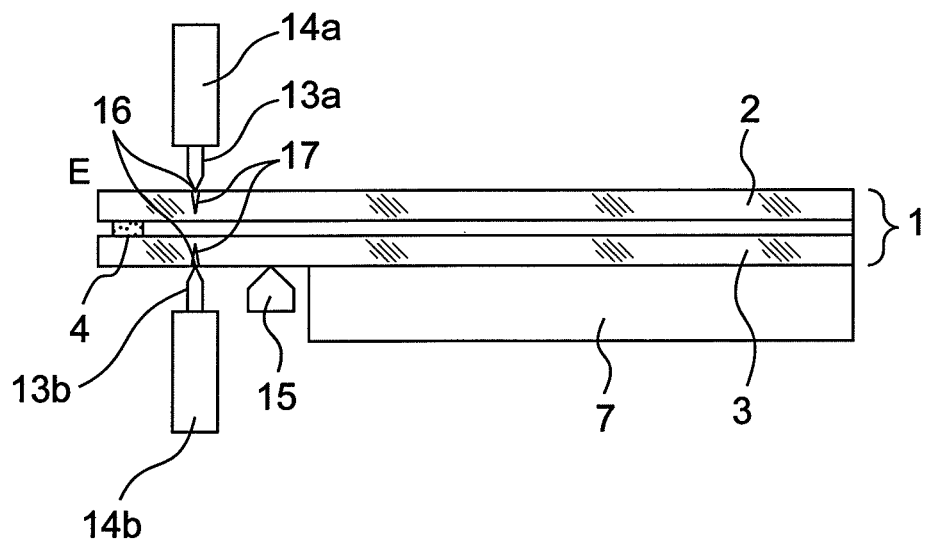
FIGS. 15A and 15B are schematic views illustrating an example of the glass cutting method according to the second embodiment of the present invention.
Figure 15B:
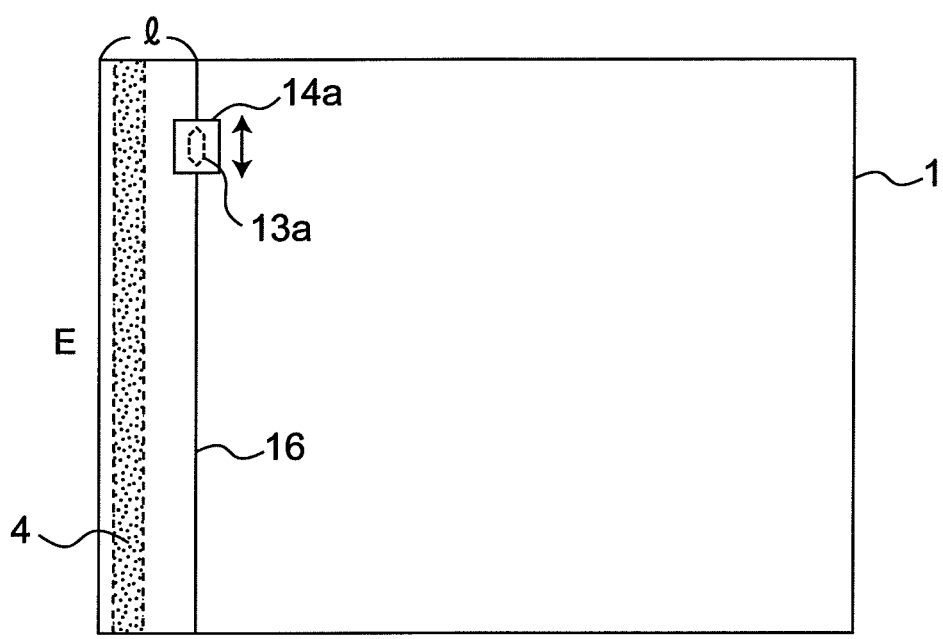

Next, as illustrated in FIG. 15A, the wheel cutters 13a and 13b being loaded are moved while being kept in press-contact with the laminated glass 1, so that desired cut lines 16 are written thereon. At this time, as illustrated in FIG. 15B which is a top view of the glass cutting apparatus, the cut lines 16 are written in the upward and downward directions in the paper plane, at a position spaced apart by a distance l from the end portion E closer to the bonding member 4. This induces cracks (referred to as vertical cracks) 17 just beneath the cut lines 16, in the vertical direction, namely in the glass-thickwise direction. The depth of the vertical cracks 17 is increased proportionally with the loads on the wheel cutters 13a and 13b. Accordingly, as the depth of the vertical cracks 17 increases, the splitting stress for splitting the laminated glass 1, namely the vibration force of the vibration unit 15 for vibrating the laminated glass 1, can be decreased. However, if the loads are excessive, cracks are also induced in the horizontal direction (referred to as horizontal cracks). Accordingly, it is desirable to set the load conditions in such a way as to induce deeper vertical cracks 17 while preventing the occurrence of horizontal cracks. The present inventors have found, from experiments, that when the depth of the vertical cracks 17 is about 10 to 15% of the thickness of the glass plate, no horizontal cracks occurs and preferable cut edges are created by cutting, although the optimum conditions are varied depending on the aspect of the laminated glass 1, the aspect of the wheel cutters 13a and 13b and the like.

Figure 16:
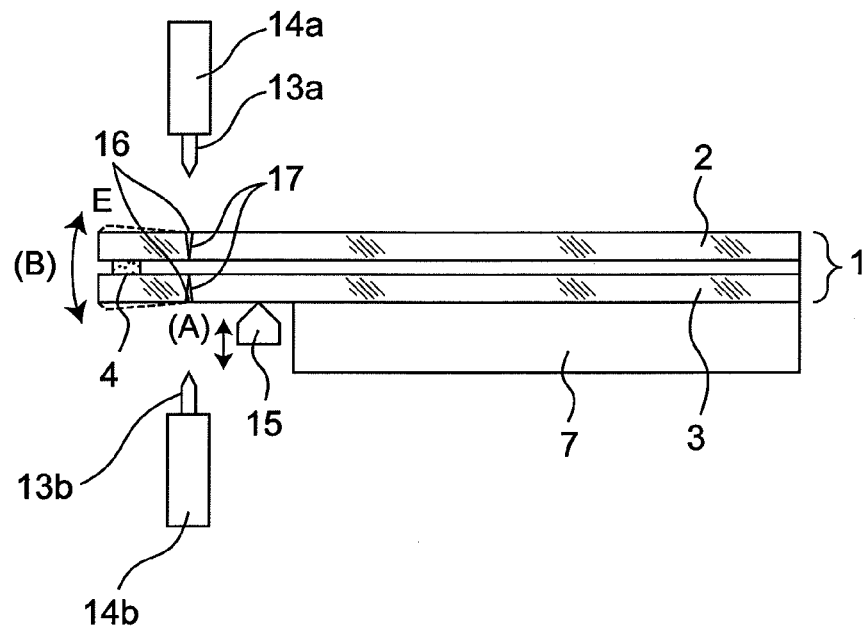
FIG. 16 is a schematic view illustrating an example of the glass cutting method according to the second embodiment of the present invention.
Figure 17:
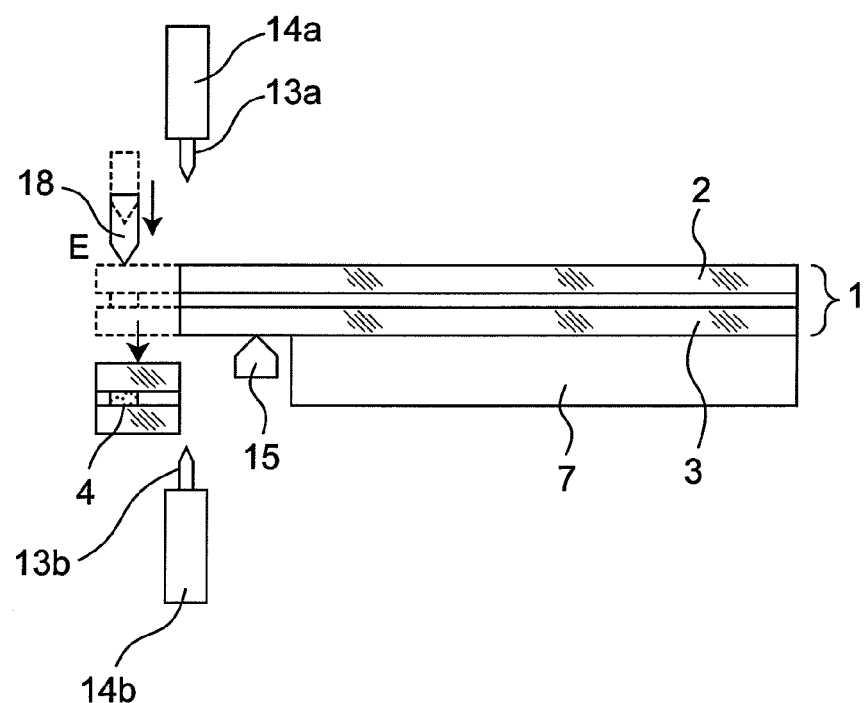
FIG. 17 is a schematic view illustrating an example of the glass cutting method according to the second embodiment of the present invention.

Next, as illustrated in FIG. 16, the wheel cutters 13a and 13b are lifted, the vibration transmission section (not illustrated) of the vibration unit 15 is brought into contact with the surface of the laminated glass 1 in the opposite side from the end portion E with respect to the cut lines 16, and the laminated glass 1 is vibrated in the direction perpendicular to surfaces of the glass plate (in the direction designated by an arrow A in the figure), namely in the thickwise direction of the laminated glass 1. Thus, the vibration force is transmitted toward the laminated glass in the end portion E side, which causes the laminated glass in the end portion E side to vibrate in the vertical direction (the direction designated by an arrow B in the figure), similarly. The vibration stresses caused thereby elongate the vertical cracks 17 to the back surfaces of the glass flat plates 2 and 3, thereby splitting the laminated glass 1. In this case, before the vertical cracks 17 elongate to the back surfaces of the glass flat plates 2 and 3, the vibration unit 15 can be stopped, and the laminated glass in the end portion E side can be pressed by a pressing member 18 as illustrated in FIG. 17 to split the laminated glass 1. It is preferable to set the depth of the vertical cracks 17 to 80% or more of the thickness of the glass flat plates 2 and 3, since this can reduce the load applied to the pressing member 18.

Figure 18:
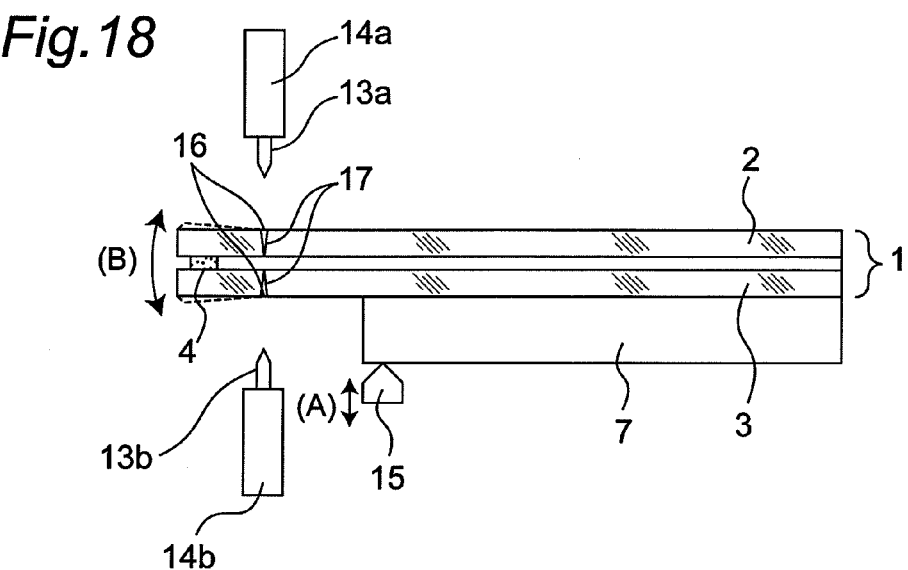
FIG. 18 is a schematic cross-sectional view illustrating another exemplary structure of the glass cutting apparatus according to the second embodiment of the present invention.

Although, in FIG. 13, the vibration unit 15 is brought into contact with the laminated glass 1 to vibrate the laminated glass 1 directly by the vibration unit 15, it is also possible to bring the vibration unit 15 into contact with the glass-plate holding unit 7 for indirectly vibrating the laminated glass 1 through the glass-plate holding unit 7, which can also offer the same effects. This method is effective, particularly in cases where the glass flat plates have a smaller thickness, more specifically a thickness equal to or less than 1 mm. For example, if the vibration unit 15 suitable for laminated glasses with larger plate thicknesses is directly brought into contact with a laminated glass with a smaller plate thickness, this will induce the inconvenience of the occurrence of horizontal cracks due to the excessive vibration force of the vibration unit 15. In this case, if the thin laminated glass is indirectly vibrated through the glass-plate holding unit 7, it is possible to weaken the vibration force for preventing the occurrence of horizontal cracks, without replacement of the vibration unit 15. Accordingly, by making the position of the vibration unit 15 to be movable to the positions illustrated in FIGS. 13 and 18, it is possible to offer the advantage of the possibility of cutting various types of laminated glasses differing in thicknesses with the same apparatus, without replacing the vibration unit 15.

Example

A plasma display panel having the following specifications was cut by the glass cutting apparatus illustrated in FIG. 13.
   a) The panel size: a size of 42 inches (570 mm in the longitudinal direction and 980 mm in the lateral direction), and a thickness of 5.75 mm
   b) The panel structure: two glass flat plates (with a plate thickness of 2.8 mm) were attached to each other at their peripheries through a flit glass (with a bonding width of 6 to 7 mm). The flit glass was formed at a position spaced apart by 10 to 15 mm from the peripheral end portions of the glass flat plates. Further, the glass flat plates were spaced part from each other by a spacing of about 0.15 mm.
   c) The material of the glass flat plates: high-strain-point glass This panel was placed on the flat table 7, and cut lines 16 were formed in the opposite surfaces of the panel, under the following conditions, using the wheel cutters 13a and 13b made of super hard alloy wheels.
   d) The angle of the wheel cutters: 120 to 165 degrees
   e) The loads on the wheel cutters: 5 to 10 kg
   f) The positions at which the cut lines 16 were written: at a distance of 20 to 35 mm from the end portions E of the glass substrates As a result, vertical cracks with a depth in the range of 0.3 to 0.4 mm were formed just beneath the cut lines 16. Further, no horizontal cracks were formed therein.

Next, the vibration transmission section of an electric vibrator is brought into contact with an intersection of a lateral center line on the panel and a longitudinal straight line extended on the panel at a position spaced apart by 10 to 20 mm from the cut lines 16 in the opposite side from the end portion E and, then, the panel was vibrated for 1 to 5 seconds by setting the vibration frequency of the electric vibrator at 10 to 1000 Hz. As a result, the vertical cracks 17 elongated to the back surfaces of the respective glass substrates, thereby splitting the panel. The sizes of glass particles or glass chips induced at this time were determined using a microscope and, as a result, their sizes were several micrometers or less.

The remaining three sides of the panel were split off with the same method to create two glass substrates separated from each other. The separated glass flat plates were polished with a polishing agent to remove the display element members on the flat plates and, as a result, preferable glass plates with no flaws induced by glass particles or glass chips generated during the glass cutting were created. Further, the glass plates were molten and, thereafter, the molten glass was reused in a panel. As a result, no defects caused by the glass plates were found.

In the present embodiment, cut lines are written on the opposite surfaces of the panel 1, vertical cracks are created therein and, then, vibrations are applied thereto to elongate the vertical cracks for splitting (fracturing) the panel. This can suppress the occurrence of glass particles during cutting, thereby eliminating an influence of glass particles on the subsequent polishing processing. Further, it is possible to split laminated glasses and hollow glasses having larger plate thicknesses, in shorter periods of time, without inducing flaws caused by horizontal cracks and chips in the cut surfaces, since they are fractured. Further, in the present embodiment, the glass flat plates 2 and 3 at the panel opposite surfaces are cut at the same time, which can eliminate the necessity of reversing the panel 1 in such a way as to shift the front side thereof to the rear side for cutting the respective glass flat plates 2 and 3. In the present embodiment, it is possible to offer the advantage of the possibility of cutting laminated glasses with larger areas with a simple method and an inexpensive apparatus.

Third Embodiment

It is desirable that, in the glass cutting apparatus according to the second embodiment, the depths of the vertical cracks formed in the glass flat plates 2 and 3 at the time of cutting them are equal to each other. In order to attain this, it is necessary that the wheel cutters 13a and 13b are pressed against the glass flat plates 2 and 3 with the same pressure. However, even when the pressing forces of the first pressing unit 14a and the second pressing unit 14b are controlled such that they are equal to each other, the upper first wheel cutter 13a is subjected to its own weight, which prevents the actual pressing forces applied to the first and second wheel cutters 13a and 13b from being equal to each other. Therefore, in order to actually apply the same pressing force to the wheel cutters 13a and 13b, it is necessary to control the pressing forces of the first pressing unit 14a and the second pressing unit 14b, taking in account the weight of the first wheel cutter 13a, thereby requiring complicated control.

In the present embodiment, in view of the aforementioned problem, there will be described a glass cutting apparatus which facilitates control of the first pressing unit 14a and the second pressing unit 14b. The glass cutting apparatus according to the present embodiment is capable of cutting a glass with a pair of cutters installed oppositely to each other in the horizontal direction with the glass plate sandwiched therebetween, at a state where the glass plate is held in the vertical direction.

Figure 19:
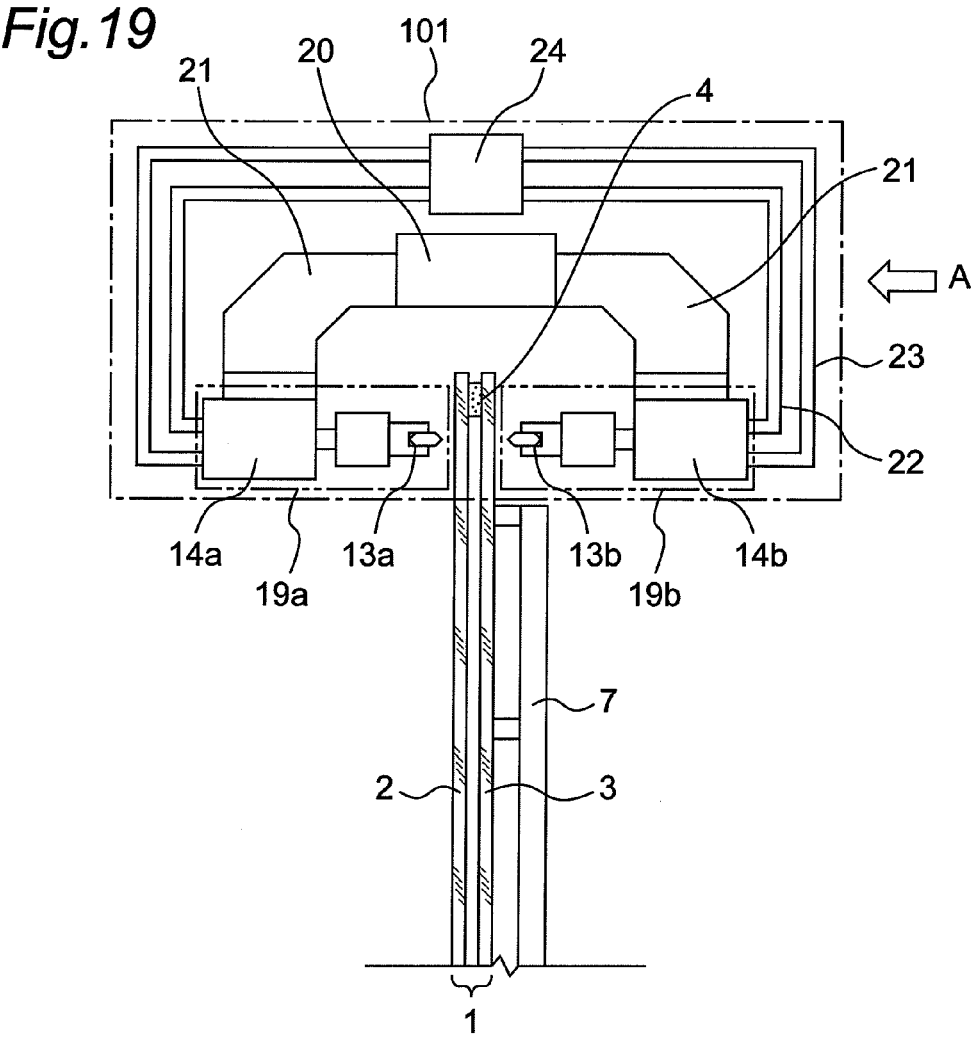
FIG. 19 is a schematic plan view illustrating an exemplary structure of a glass cutting apparatus according to a third embodiment of the present invention.
Figure 20:
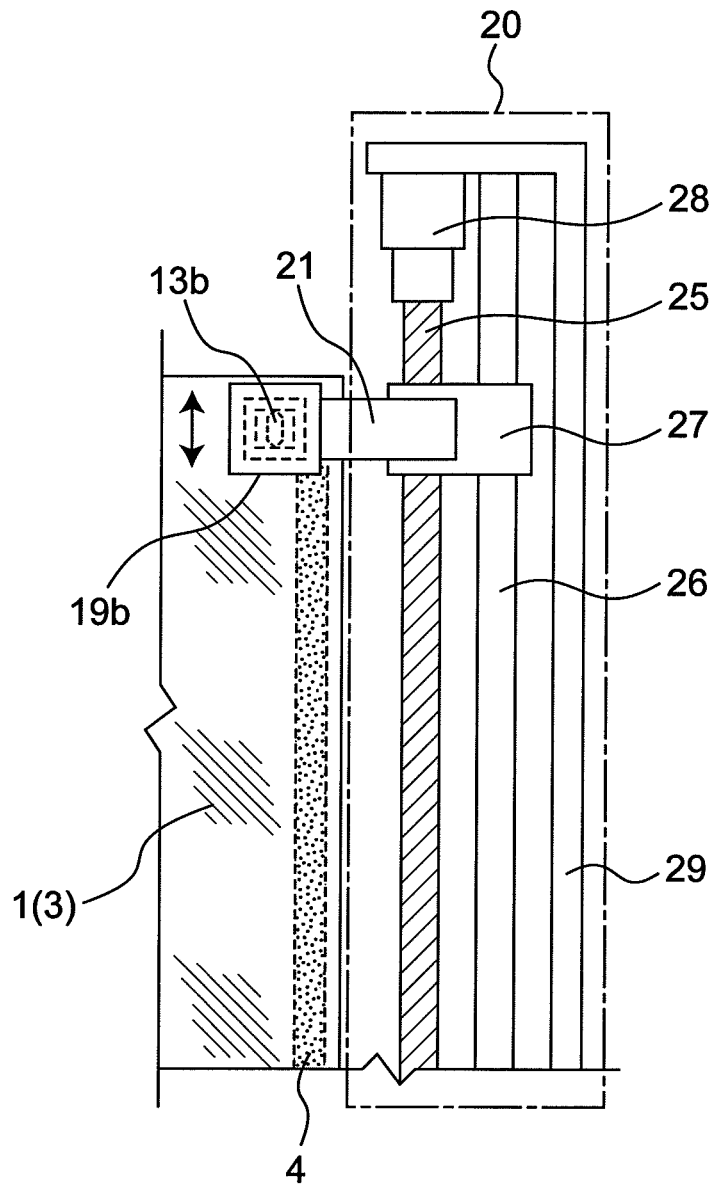
FIG. 20 is a schematic side view of the glass cutting apparatus in FIG. 19.

FIG. 19 is a schematic top plan view illustrating an exemplary structure of the glass cutting apparatus according to the third embodiment of the present invention. FIG. 20 is a schematic side view illustrating the glass cutting apparatus of FIG. 19 from the direction of an arrow A. Further, in the present embodiment, there will be exemplified a case where a laminated glass is employed as a to-be-cut glass.

Referring to FIG. 19, the laminated glass 1 is constituted by a first glass flat plate 2 and a second glass flat plate 3, and a bonding member 4 bonding these glass flat plates to each other at their peripheral portions, wherein the bonding member 4 is made of a flit glass, an epoxy resin adhesive agent or the like. The glass-plate holding unit 7 (namely, the fixing unit) holds the laminated glass 1 at a state where it is vertically upright.

The glass cutting apparatus 101 is constituted by a first cut-line forming portion 19a for forming cut lines in the first glass flat plate 2, a second cut-line forming portion 19b for forming cut lines in the second glass flat plate 3, and a moving device 20 for moving the first cut-line forming portion 19a and the second cut-line forming portion 19b at the same time in the direction perpendicular to the paper plane. The first cut-line forming portion 19a and the second cut-line forming portion 19b are coupled to the moving device 20 through respective supporting arm portions 21.

The first cut-line forming portion 19a is constituted by a first wheel cutter 13a and the first pressing unit 14a for pressing the first wheel cutter 13a in the direction perpendicular to the first glass flat plate 2.

The second cut-line forming portion 19b has the same structure as that of the first cut-line forming portion 19a and is constituted by a second wheel cutter 13b and the second pressing unit 14b for pressing the second wheel cutter 13b in the direction perpendicular to the second glass flat plate 3.

Further, the first cut-line forming portion 19a and the second cut-line forming portion 19b are coupled to the moving device 20 through the supporting arm portions 21, such that the first wheel cutter 13a and the second wheel cutter 13b are opposed to each other.

The wheel cutters 13a and 13b can be any generally well-known cut-line forming units, such as super hard alloy wheels and diamond wheels.

The pressing units 14a and 14b can be any generally well-known pressing units, such as pneumatic devices or hydraulic devices. In the present embodiment, pneumatic devices are employed as the pressing units 14a and 14b. Therefore, in the following description, the terms "pressing units" and "pneumatic devices" will be used as terms having the same meaning.

An air-intake pipe 22 supplies compressed air created by an air compressor (not illustrated) to air cylinders in the pneumatic devices. An air-exhaust pipe 23 discharges compressed air from the air cylinders. A pressing control device 24 adjusts the air pressure within the air cylinders to adjust the pressing forces. The pressing control device 24 is structured such that, when the pressing control device 24 sets a predetermined air pressure, the first pressing unit 14a and the second pressing unit 14b generate pressing forces equal to each other.

The glass-plate holding unit 7 can be any fixing unit capable of fixing the laminated glass 1 during cutting such that it is not moved. When the laminated glass 1 can be fixed only through its own weight, the laminated glass 1 can be fixed with a supporting table, as illustrated in FIG. 19. However, when the laminated glass 1 cannot be fixed only through its own weight, the laminated glass 1 can be fixed through a suction device or a vise.

Glass materials applicable to the present invention are any generally well-known glasses, such as soda-lime glass, clear glass, silica glass, non-alkali heat resistance glass and high-strain-point glass. As an aspect of the to-be-cut glass, it is possible to employ either a laminated glass constituted by two glass flat plates and a bonding member bonding these glass flat plates to each other over their entire surfaces or a glass flat plate with a larger plate thickness equal to or more than 4 mm, as well as a hollow glass as illustrated in FIG. 19, as a matter of course.

Next, with reference to FIG. 20, the moving device will be described, in detail. The moving device 20 is constituted by a ball screw 25, a slide guide (generally, referred to as an LM guide) 26, an operating portion 27, a driving motor 28 such as an AC servo motor, and a frame 29.

The operating portion 27 is provided with a female screw and, if the ball screw 25 is rotated by the driving motor 28, the operating portion 27 moves upwardly and downwardly along the slide guide 26. The driving motor 28, the ball screw 25 and the slide guide 26 are supported and fixed by the frame 29, as illustrated in FIG. 20.

The second cut-line forming portion 19b is coupled to the supporting arm portion 21, and the supporting arm portion 21 is coupled to the operating portion 27. Accordingly, the glass cutting apparatus is structured such that, if the operating portion 27 is driven by the moving device 20, the second cut-line forming portion 19b moves upwardly and downwardly in the directions of arrows.

Figure 21:
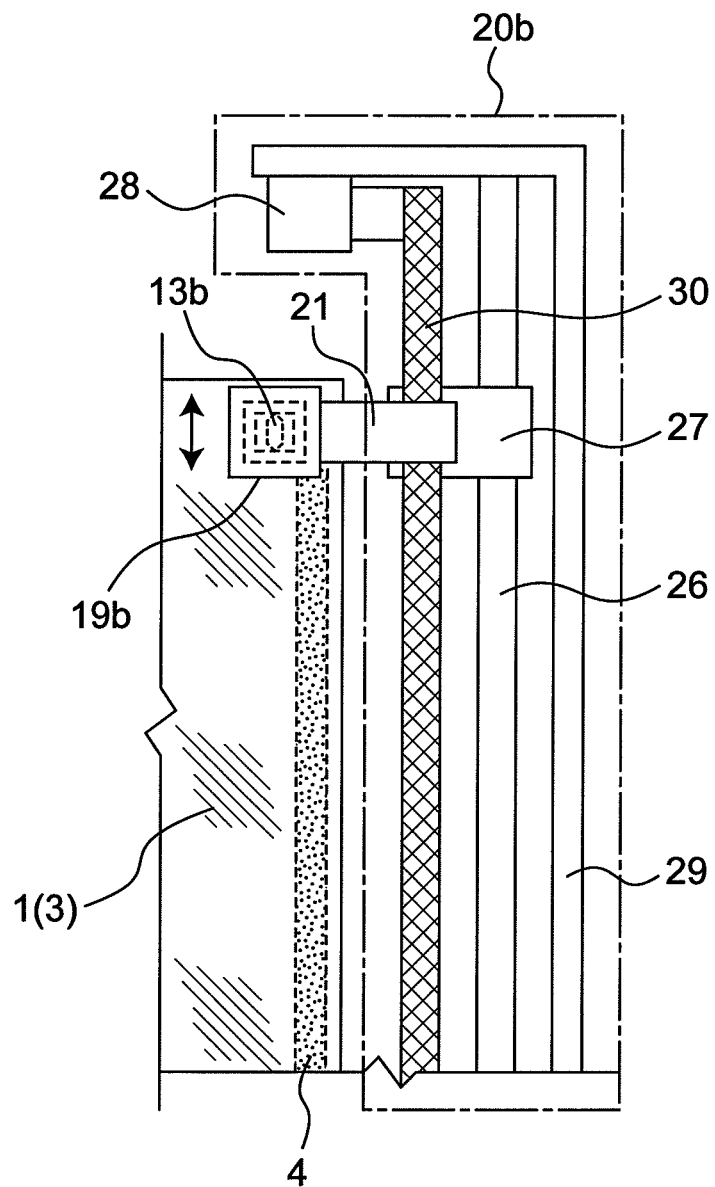
FIG. 21 is a schematic side view illustrating another exemplary structure of the glass cutting apparatus according to the third embodiment of the present invention.

FIG. 21 illustrates another structure of the moving device. This structure is different from that of the moving device 20 in FIG. 20, in the driving unit for the operating portion. Therefore, only the difference will be described.

An operating portion 27 in a moving device 20b is secured to a timing belt 30 coupled to a driving motor 28. The glass cutting apparatus is structured such that, by rotating the timing belt 30 by the driving motor 28, a second cut-line forming portion 19b is moved upwardly and downwardly in the directions of arrows.

Further, although, in FIG. 19, the cut-line forming portions 19a and 19b are moved while the to-be-cut glass (the laminated glass 1) is fixed, the to-be-cut glass can be moved while the cut-line forming portions are fixed, which can also offer the same effects.

Hereinafter, there will be described a method for forming cut lines in the laminated glass 1 using the glass cutting apparatus 101 in FIG. 19. Further, in the present embodiment, there will be described a method for separating the first glass flat plate 2 and the second glass flat plate 3 from each other by cutting down the bonding portions at which they are bonded to each other through the bonding member 4.

Figure 22:
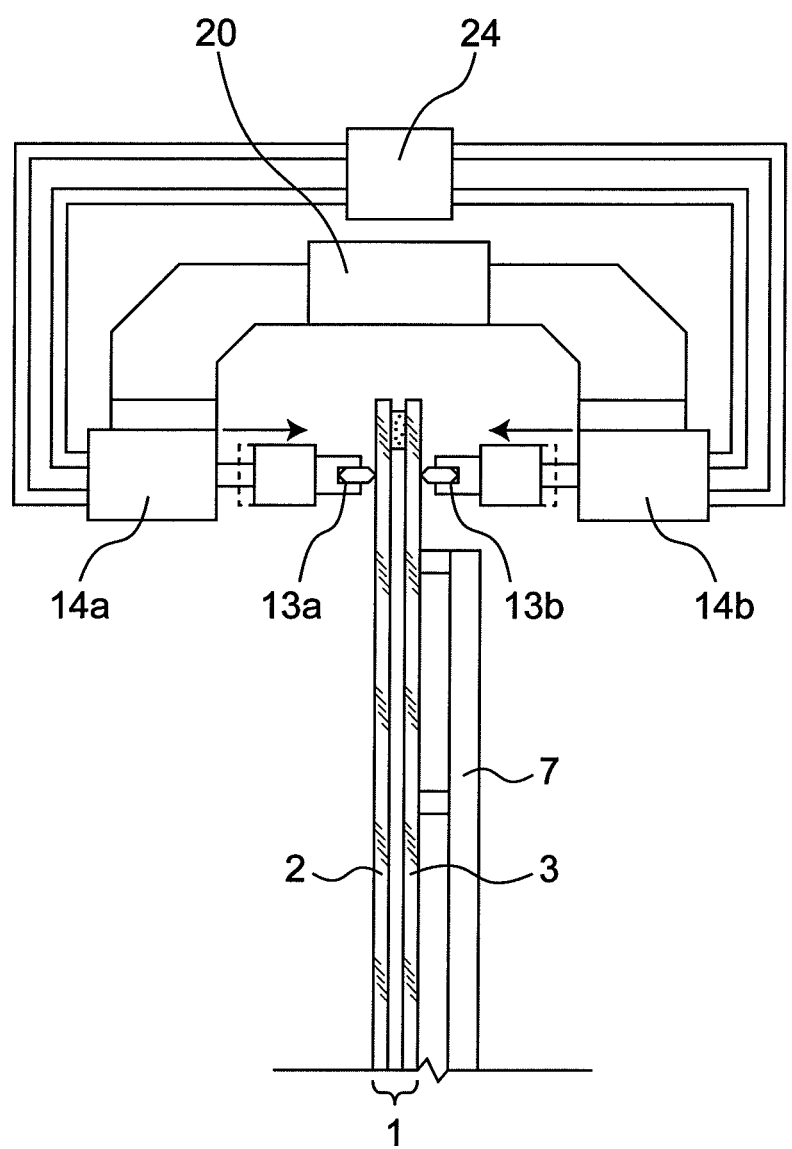
FIG. 22 is an operation explanatory view of a glass cutting method according to the third embodiment of the present invention.

At first, the glass cutting apparatus 101 is fixed, such that the laminated glass 1 is vertically placed, and the position at which a cut line is to be formed exists inside the bonding portions, as illustrated in FIG. 19. Next, compressed air adjusted to a predetermined air pressure by the pressing control device 24 is supplied to the first pressing unit 14a and the second pressing unit 14b through the air-intake pipe 22. Thus, as illustrated in FIG. 22, the first wheel cutter 13a and the second wheel cutter 13b press the first glass flat plate 2 and the second glass flat plate 3 with a predetermined pressing force.

Next, the moving device 20 is driven to move the first wheel cutter 13a and the second wheel cutter 13b from the upper end of the laminated glass 1 to the lower end thereof. Then, a pair of opposing cut lines is formed in the laminated glass 1. Next, a hammer or the like is tapped with on the cut lines to form vertical cracks for cutting down the bonding portion.

The other bonding portions of the laminated glass 1 are all cut down according to the same method, thereby separating the first glass flat plate 2 and the second glass flat plate 3 from each other.

Example

A plasma display panel having the following specifications was cut by the glass cutting apparatus illustrated in FIG. 19.
  a) The panel size: 42 inches (570 mm in the longitudinal direction and 980 mm in the lateral direction), and a thickness of 5.75 mm
  b) The panel structure: two glass substrates (with a plate thickness of 2.8 mm) were attached to each other at their peripheries with a flit glass (with a bonding width of 6 to 7 mm). The flit glass was formed at a position spaced apart by 10 to 15 mm from the peripheral end portions of the glass substrates. Further, the glass substrates were spaced part from each other by a spacing of about 0.15 mm.
  c) The glass substrates: high-strain-point glass This plasma display panel was vertically placed, and cut lines were formed in the opposite surfaces of the plasma display panel, under the following conditions, by using super hard alloy wheels as the first wheel cutter 13a and the second wheel cutter 13b, and by setting the wheel angles and the wheel pressing loads for both wheels to be equal to each other.
  d) The wheel angle: 120 to 165 degrees
  e) The wheel pressing load: 5 to 10 kg
  f) The positions at which the cut lines were formed: at a distance of 20 to 35 mm from the end portions of the glass substrates As a result, vertical cracks with a depth in the range of 0.3 to 0.4 mm were formed just beneath the cut lines. Further, no horizontal cracks were formed therein.

Next, a hammer is tapped on the cut lines to elongate the vertical cracks to the back surfaces of the glass substrates, thereby splitting the panel. The sizes of glass particles induced at this time were determined using a microscope and, as a result, their sizes were several micrometers or less.

The remaining three sides of the plasma display panel were split off with the same method to create two glass substrates separated from each other. The separated glass substrates were polished with a polishing agent to remove the display element members on the glass substrates and, as a result, preferable glass plates with no flaws induced by glass particles generated during the glass cutting were created.

In the present embodiment, the panel is split by the pair of cutters placed oppositely to each other in the horizontal direction with the glass plate sandwiched therebetween, at a state where the panel is held vertically. Accordingly, even when the first pressing unit 14a and the second pressing unit 14b press the first wheel cutter 13a and the second wheel cutter 13b with the same pressing force, the pressing forces applied to the glass flat plates 2 and 3 by the first and second wheel cutters 13a and 13b can be made equal to each other, without being influenced by the weights of the wheel cutters. As a result, the depths of the vertical cracks formed in the glass flat plates 2 and 3 are made equal to each other. This can eliminate the necessity of finely controlling the respective pressing forces from the two pressing units, which can simplify the control of the pressing units and can simplify the apparatus structure.

Further, according to the present embodiment, similarly, it is possible to offer the advantage of the possibility of splitting a laminated glass or a hollow glass with a larger plate thickness, in a short period of time, in such a way as to suppress the occurrence of glass particles and prevent the occurrence of flaws caused by horizontal cracks and chips in the cut surfaces.

Fourth Embodiment

A glass-substrate disassembling apparatus according to the present embodiment has a structure corresponding to the combination of the structure of the glass-substrate disassembling system described in the first embodiment and the structure of the glass cutting apparatus described in the third embodiment.

Figure 23:
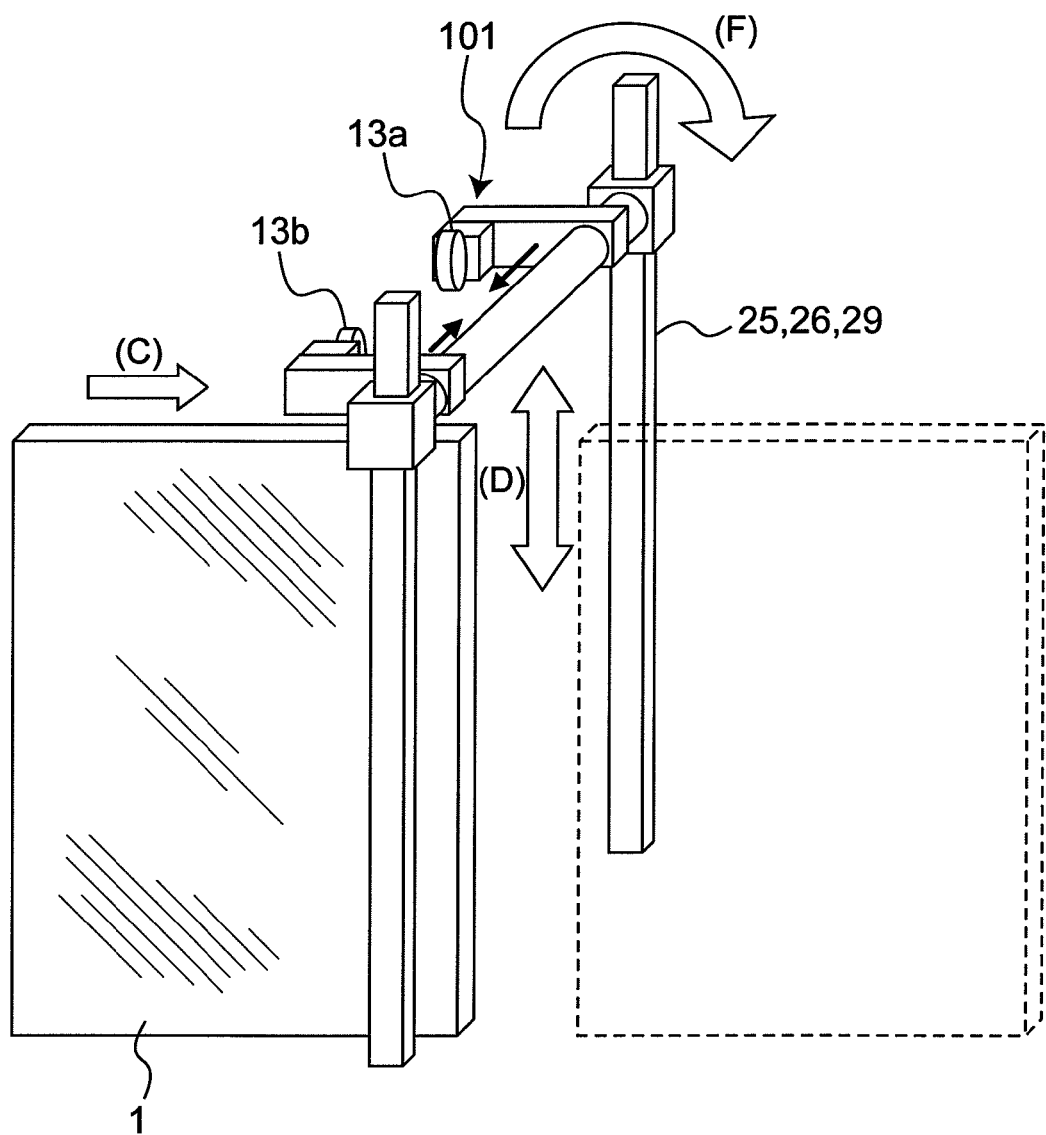
FIG. 23 is a perspective view of a glass-substrate disassembling apparatus according to a fourth embodiment of the present invention.

FIG. 23 is a perspective view of the glass-substrate disassembling apparatus according to the fourth embodiment of the present invention. A laminated glass 1 is transferred in the direction designated by an arrow C in the figure, at a state where the surfaces of the glass plate of the laminated glass 1 are vertically held (the transfer unit is not illustrated). In cutting the laminated glass 1, a first wheel cutter 13a and a second wheel cutter 13b installed oppositely to each other in the horizontal direction with the laminated glass 1 sandwiched therebetween are pressed against the laminated glass 1 with pressing forces equal to each other. The wheel cutters 13a and 13b are moved in the upward and downward directions (the directions designated by an arrow D in the figure), at the state where they are pressed thereagainst. Thus, a pair of cut lines is formed in the laminated glass 1. In FIG. 23, the pressing unit, the pressing control device and the like are not illustrated. The glass-substrate disassembling apparatus according to the present embodiment uses a single post as a ball screw 25, a slide guide 26 and a frame 29.

Next, with reference to schematic views in FIGS. 24 and 25, there will be described operations of the glass-substrate disassembling apparatus according to the present invention. The glass-plate disassembling apparatus operates according to flow charts in FIGS. 26 and 27.

Figure 26:
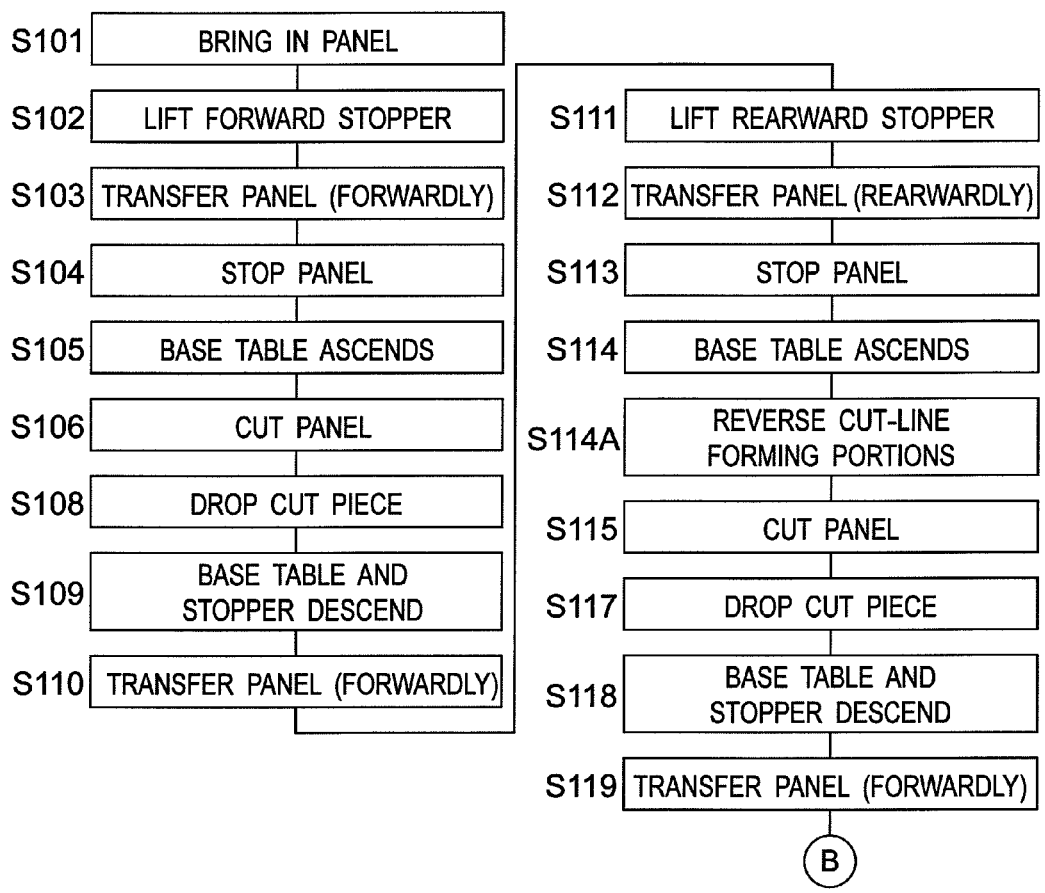
FIG. 26 is a flow chart illustrating the operations and the disassembling method with the glass-substrate disassembling apparatus according to the fourth embodiment of the present invention.

Referring to FIG. 24A, if the panel 1 is brought in and placed on the transfer unit 6 in the present apparatus, at a state where the panel flat surfaces are vertically held, the transfer unit 6 transfers the panel 1 in the forward direction (step S101 in FIG. 26). In this case, the term "forward direction" refers to the rightward direction in the figure, while the term "rearward direction" refers to the leftward direction in the figure.

Next, the forward stopper 8 in the present apparatus is lifted to take an attitude capable of coming into contact with the panel 1 being transferred in the forward direction, namely a contact attitude. Namely, when the panel 1 is transferred, before the frontmost portion of the panel 1 passes above the forward stopper 8, the forward stopper 8 is lifted to take the contact attitude (step S102 in FIG. 26). In this state, the panel 1 is further transferred in the forward direction (step S103 in FIG. 26), then comes into contact with the forward stopper 8 as illustrated in FIG. 24B and stops at this position, namely a first stop position (step S104 in FIG. 26).

After the panel 1 is stopped by the forward stopper 8, the base table as the glass-plate holding unit 7 starts ascending (step S105 in FIG. 26). As illustrated in FIG. 24C, since the glass-plate holding unit 7 ascends, the panel 1 separates from the transfer unit 6 and is secured to the glass-plate holding unit 7 due to its own weight, at a state where its frontmost portion is kept in contact with the forward stopper 8.

Figure 25A:
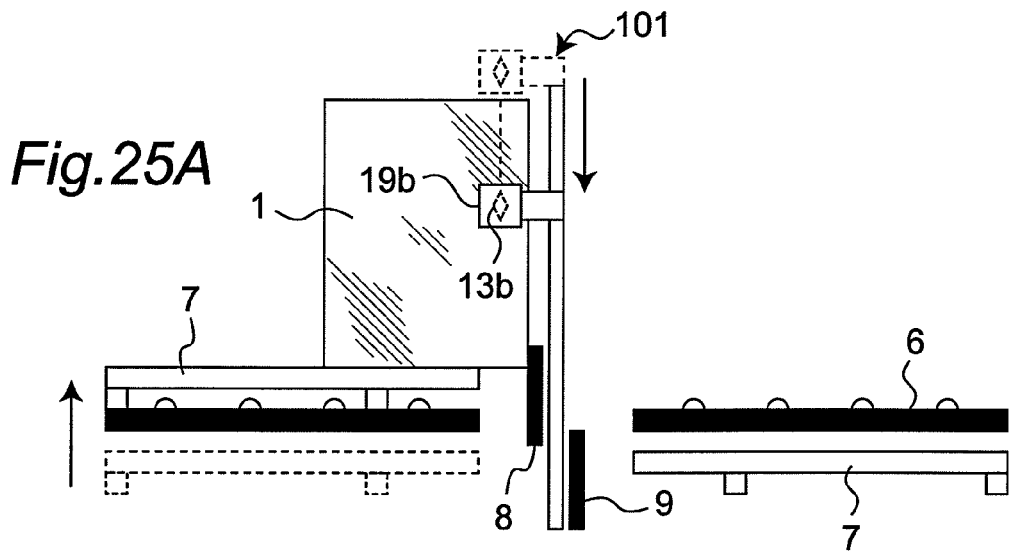
FIGS. 25A to 25C are operation explanatory views illustrating the operations and the disassembling method with the glass-substrate disassembling apparatus according to the fourth embodiment of the present invention.

Next, as illustrated in FIG. 25A, the wheel cutters 13a and 13b in the glass cutting apparatus 101 are moved from the upper side to the lower side in the direction designated by an arrow in the figure. Thus, the frontmost single side of the panel 1 is cut (step S106 in FIG. 26). The portion of the panel 1 to be cut is determined by the interval between the wheel cutters 13a and 13b and the forward stopper 8. In this case, the interval is set, such that the panel is cut at an inner portion with respect to the bonding member 4 (see FIGS. 1A and 1B) coupling the first glass flat plate 2 and the second glass flat plate 3 to each other.

Figure 25B:
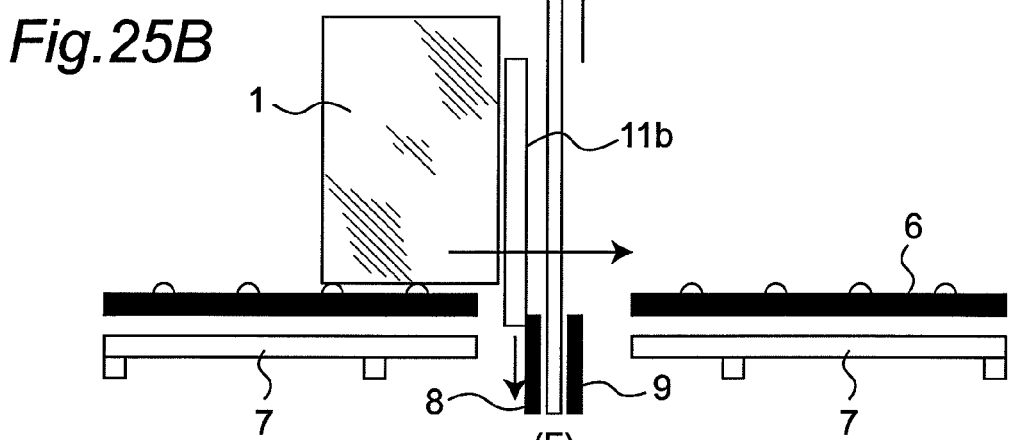

After the completion of the cutting of the single side of the panel 1, as illustrated in FIG. 25B, the cut piece 11b falls downwardly (step S108 in FIG. 26). Thereafter, the glass-plate holding unit 7 and the forward stopper 8 descend below the transfer unit 6 to take a state capable of further transferring the panel 1, namely an open attitude (step S109 in FIG. 26), and the panel 1 is further transferred in the forward direction (step S110 in FIG. 26).

Figure 25C:
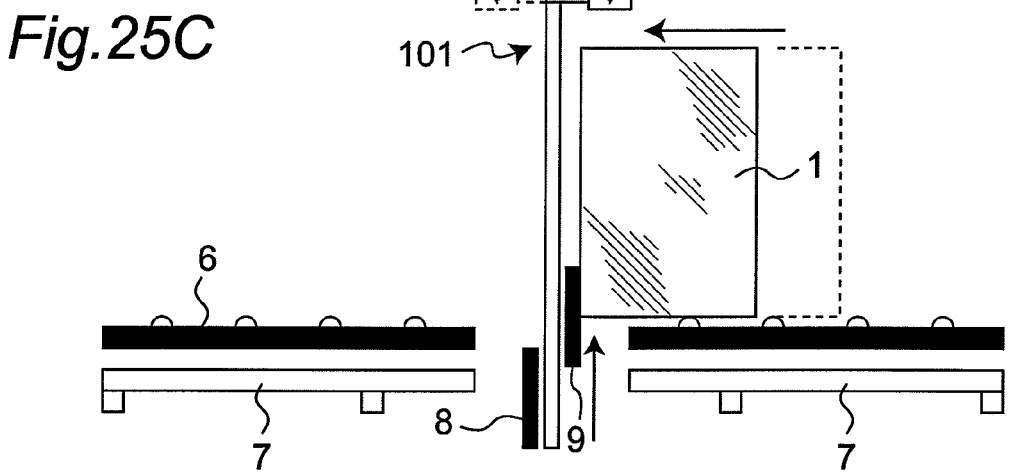

Since the panel 1 is transferred in the forward direction, the rearmost portion of the panel 1 passes above the rearward stopper 9 and, thereafter, the rearward stopper 9 is lifted to take an attitude in which its upper end portion is protruded upwardly beyond the transfer unit 6, namely a contact attitude (step S111 in FIG. 26). Next, the direction of transfer by the transfer unit 6 is reversed for transferring the panel 1 in the rearward direction (step S112 in FIG. 26). The panel 1 transferred in the rearward direction comes into contact with the rearward stopper 9 which has been lifted as illustrated in FIG. 25C and stops at this position, namely a second stop position (step S113 in FIG. 26).

After the panel 1 is stopped by the rearward stopper 9, similarly to the aforementioned step S105 (FIG. 26), the glass-plate holding unit 7 starts ascending (step S114 in FIG. 26), which separates the panel 1 from the transfer unit 6 and secures the panel 1 to the base table 7 at a state where the rearmost portion of the panel 1 is kept in contact with the rearward stopper 9. The cut-line forming portions 19a and 19b including the wheel cutters 13a and 13b are reversed in the direction designated by an arrow F in the figure (step S114A in FIG. 26). Similarly to the aforementioned step S106, the wheel cutters 13a and 13b in the glass cutting apparatus 101 are moved from the upper side to the lower side in the direction designated by an arrow in the figure, thereby cutting the rearmost single side of the panel 1 (step S115 in FIG. 26). In this step, similarly, the panel 1 is cut at an inner portion with respect to the bonding member 4 (see FIGS. 1A and 1B) applied to the rearmost single side of the panel 1.

Similarly to the aforementioned steps S108 to S110, the cut piece falls downwardly (step S117 in FIG. 26), and, then, the base table 7 and the rearward stopper 9 descend below the transfer unit 6, thereby taking an open attitude (step S118 in FIG. 26). Then, the panel 1 is transferred in the forward direction (step S119 in FIG. 26).

Next, the panel 1 is transferred to the rotation unit. The panel 1 transferred thereto is temporarily laid thereon such that the surfaces of the glass plate of the panel 1 are along the horizontal direction, then is rotated in the horizontal direction by 90 degrees through a plurality of free rollers, and, then, is caused to be upright such that the surfaces of the glass plate of the panel 1 are along the vertical direction. Due to this rotation, the cut sides of the panel 1 become the upper and lower sides thereof, while the uncut two sides of the panel 1 appear at the front and rear sides in the direction of transfer. After the completion of the rotation, the rotation unit transfers the panel 1 in the forward direction and, subsequently, the transfer unit 6 starts transferring the panel 1 in the forward direction.

Thereafter, similarly to steps S102 to S119 in FIG. 26, the uncut two sides of the panel 1 are cut at inner portions with respect to the bonding member 4 (FIG. 1), at a state where the panel 1 is fixed at stop positions, namely a third stop position and a fourth stop position (steps S121 and S138 in FIG. 27). However, the length of the sides of the panel 1 which should be cut in steps S125 and S134, in general, is different from the length of the sides of the panel 1 which have been cut in steps S106 and S115. Therefore, the glass cutting apparatus used in steps S125 and S134 is structured to be suitable for cutting the panel 1 by a length different from the length by which the panel 1 is cut by the glass cutting apparatus used in steps S106 and S115.

The first glass flat plate 2 (FIG. 1) and the second glass flat plate 3 (FIG. 1) in the panel 1 which has been cut at portions coated with the bonding member 4 (FIG. 1) in the aforementioned steps are brought into a state where there is no member bonding them to each other. An operator disassembles the panel 1 at this state into the glass flat plates 2 and 3 (step S139 in FIG. 27), then removes the pixel electrodes and the fluorescent material applied thereto (step S140 in FIG. 27) and then transfers both the flat plates 2 and 3 into glass recycling processing to recycle the glass (step S141 in FIG. 27).

In the present embodiment, similarly, it is possible to facilitate the control of the pressing unit and, also, it is possible to simplify the apparatus structure. Further, it is possible to split laminated glasses and hollow glasses having larger plate thicknesses, in shorter periods of time, in such a way as to suppress the occurrence of glass particles and prevent the occurrence of flaws due to horizontal cracks and chips in the cut surfaces. Furthermore, it is possible to offer the advantages of excellent safety for operators and the possibility of disassembling a panel into a first glass flat plate and a second glass flat plate with higher efficiency. Further, since the glass-substrate disassembling apparatus according to the present embodiment cuts a panel at a state where the panel is upright (at a state where its surfaces of the glass plate are held in the vertical direction), it is possible to reduce the installation area.

Figure 28A:
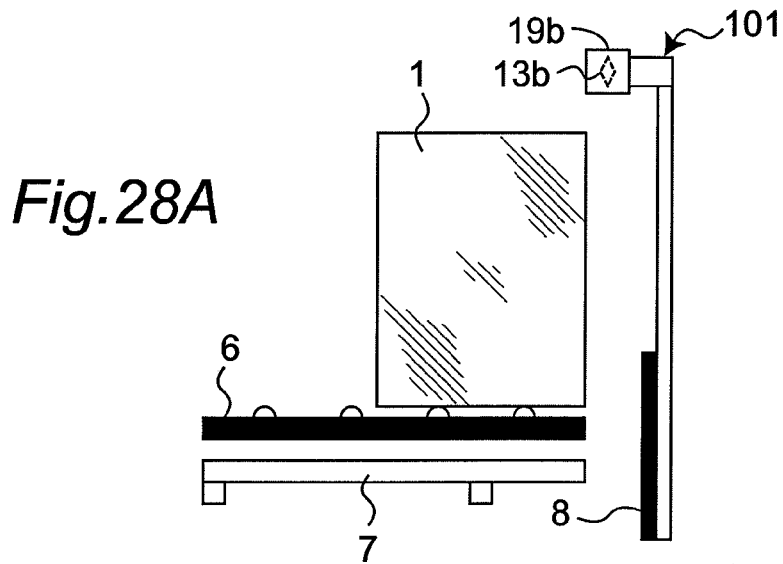
FIGS. 28A to 28C are operation explanatory views illustrating an exemplary modification of the glass-substrate disassembling apparatus according to the fourth embodiment of the present invention.
Figure 28B:
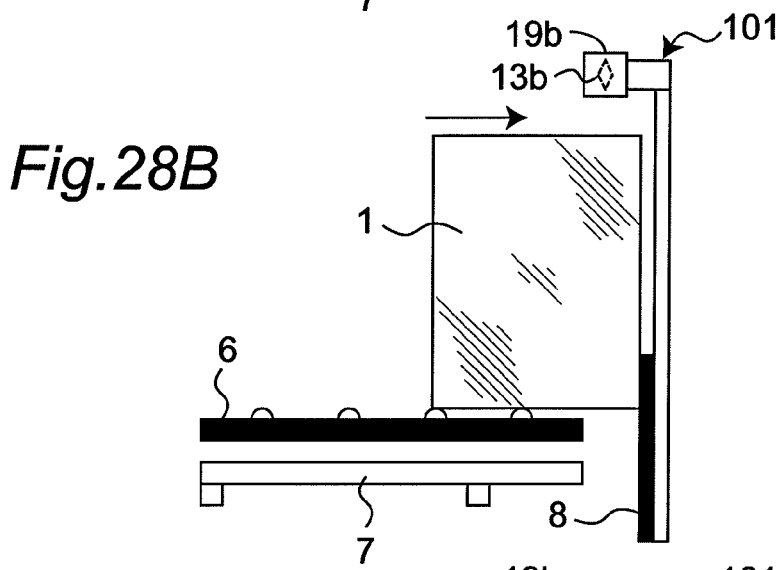

FIGS. 28 and 29 illustrate another exemplary structure of the glass-substrate disassembling apparatus. This structure is different from that of the glass-substrate disassembling apparatus in FIGS. 24 and 25, in that it does not include the stopper 9, the right-half portion of the transfer unit 6, and the right half portion of the glass-plate holding unit 7.

Figure 28C:
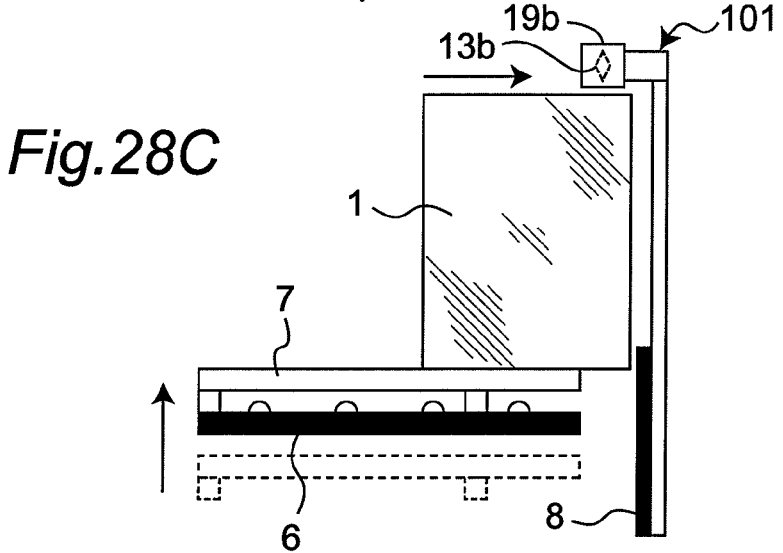
Figure 29A:
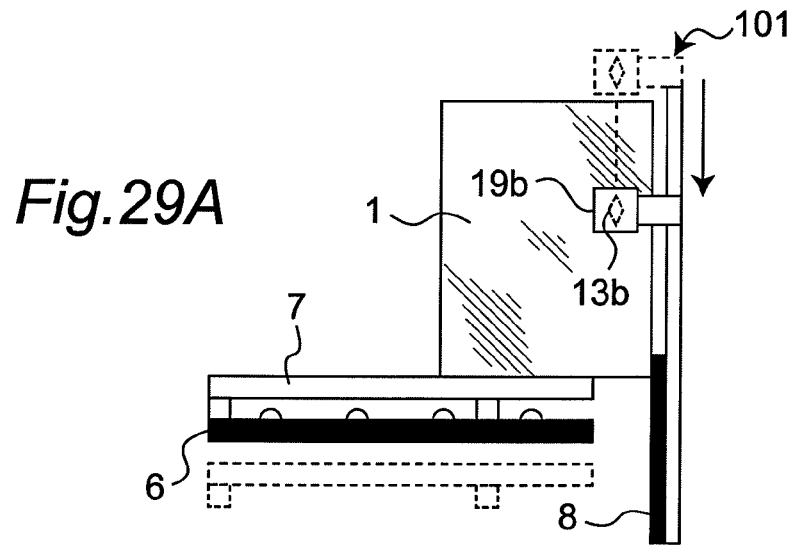
FIGS. 29A to 29C are operation explanatory views illustrating an exemplary modification of the glass-substrate disassembling apparatus according to the fourth embodiment of the present invention.
Figure 29B:
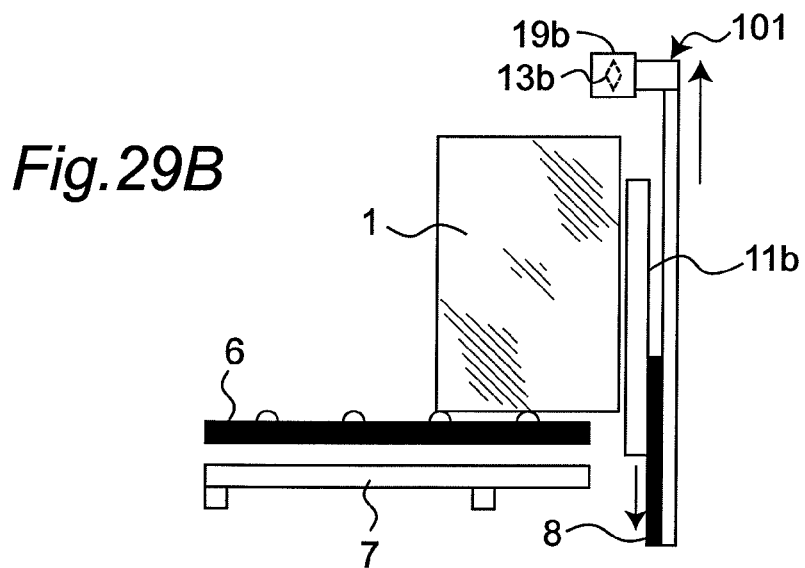
Figure 29C:
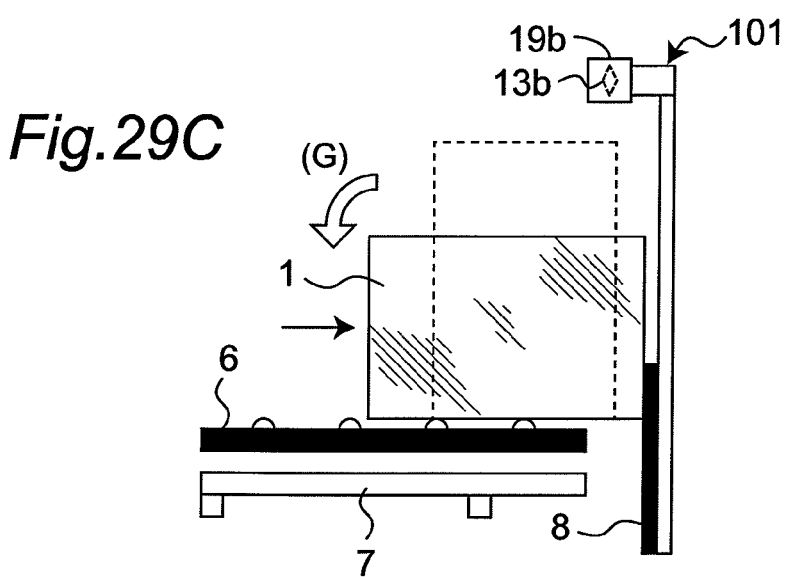

A panel 1 is transferred in the forward direction (FIG. 28A) and comes into contact with a stopper 8 to stop at this position, namely a stop position (FIG. 28B), then the glass-plate holding unit 7 is lifted, and the panel 1 is secured to the glass-plate holding unit 7 (FIG. 28C). Next, the frontmost single side of the panel 1 is cut (FIG. 29A), the cut piece 11b falls downwardly (FIG. 29B), and, then, the panel 1 is sucked by a suction device (not illustrated) and is rotated by 90 degrees in the direction designated by an arrow G in the figure (FIG. 29C). Similarly, the panel 1 is rotated by 90 degrees twice, so that all sides of the panel 1 can be cut. This structure requires only a single stopper and eliminates the necessity of operating the stopper upwardly and downwardly. Further, this structure requires only a single set of the transfer unit and the glass-plate holding unit, while the glass-substrate disassembling apparatus according to the present embodiment requires two sets of the transfer unit and the glass-plate holding unit. This can reduce the installation area for the apparatus.

INDUSTRIAL APPLICABILITY

The glass cutting method and the apparatus therefor are particularly useful, in fields where hollow glasses and laminated glasses having larger plate thicknesses, such as PDPs and liquid crystal display panels, are reused.

The invention claimed is:

1. A glass cutting apparatus comprising:
    a glass-plate holding unit that holds a glass plate, comprising two glass substrates which are attached to each other, by supporting one end of the glass plate;
    a pair of cutters which form a pair of cut lines in opposite surfaces of an end portion of the glass plate which is not supported, by moving the pair of cutters and the end portion of the glass plate relative to each other; and
    a vibration unit that vibrates the end portion of the glass plate for forming vertical cracks just beneath the cut lines;
    wherein the vibration unit is located on an opposite side from the end portion with respect to the cut lines to vibrate the glass plate in a thickness direction thereof.

2. The glass cutting apparatus according to claim 1, further comprising:
    a first pressing unit that presses one of the cutters to one of the surfaces of the glass plate with a pressing force (P);
    a second pressing unit that is placed oppositely to the first pressing unit and presses the other one of the cutters to the other surface of the glass plate with the pressing force (P); and
    a moving unit that moves the pair of cutters pressing the glass plate with the pressing force (P).

3. The glass cutting apparatus according to claim 1, wherein
    the glass plate is a display panel, and the two glass substrates of the glass plate comprise a first glass flat plate and a second glass flat plate which are attached to each other with a spacing provided therebetween.

4. The glass cutting apparatus according to claim 1, wherein
    the glass-plate holding unit holds the glass plate along the vertical direction.

5. A display panel glass-substrate disassembling apparatus for disassembling a display panel comprising two glass substrates bonded to each other at peripheral portions thereof to recycle the display panel, the glass-substrate disassembling apparatus comprising:
    a transfer unit capable of transferring the display panel in forward and rearward directions;
    a stopping unit that stops the display panel being transferred at a predetermined stop position;
    a fixing unit that fixes, at the stop position, the display panel stopped at the stop position; and
    a cutting unit comprising a glass cutting apparatus for cutting at least a single side of the display panel fixed by the fixing unit, said glass cutting apparatus comprising
        a glass-plate holding unit that holds a glass plate, comprising two glass substrates which are attached to each other, by supporting one end of the glass plate,
        a pair of cutters which form a pair of cut lines in opposite surfaces of an end portion of the glass plate which is not supported, by moving the pair of cutters and the end portion of the glass plate relative to each other, and
        a vibration unit that vibrates the end portion of the glass plate for forming vertical cracks just beneath the cut lines,
        wherein the vibration unit is located on an opposite side from the end portion with respect to the cut lines to vibrate the glass plate in a thickness direction thereof.

6. The display panel glass-substrate disassembling apparatus according to claim 5, wherein
    the stopping unit comprises a first stopping unit that is positioned downstream of the cutting unit in the forward direction and is provided to be switchable between a contact attitude and an open attitude, the contact attitude is an attitude of the first stopping unit, in which the display panel transferred in the forward direction to reach a first stop position comes into contact with the first stopping unit, and the open attitude is an attitude of the first stopping unit, in which the display panel transferred to the first stop position does not come into contact with the first stopping unit.

7. The display panel glass-substrate disassembling apparatus according to claim 6, wherein the stopping unit further comprises a second stopping unit that is positioned upstream of the cutting unit in the forward direction and is provided to be switchable between a contact attitude and an open attitude, the contact attitude is an attitude of the second stopping unit, in which the display panel transferred in the rearward direction to reach a second stop position comes into contact with the second stopping unit, and the open attitude is an attitude of the second stopping unit, in which the display panel transferred to the second stop position does not come into contact with the second stopping unit.

8. The display panel glass-substrate disassembling apparatus according to claim 5, wherein the fixing unit is a base table capable of ascending and descending while holding the display panel.

9. The display panel glass-substrate disassembling apparatus according to claim 5, wherein the fixing unit includes a pressing unit that presses the display panel, and the pressing unit presses the display panel toward the transfer unit.

10. The display panel glass-substrate disassembling apparatus according to claim 5, further comprising:

a rotation unit that is positioned downstream of the transfer unit in the forward direction and rotates the display panel by 90 degrees about an axis perpendicular to the display panel.

11. A display panel glass-substrate disassembling system for disassembling a display panel comprising two glass substrates bonded to each other at peripheral portions thereof to recycle the display panel, the glass-substrate disassembling system comprising:

a first glass-substrate disassembling apparatus;

a rotation unit that rotates the display panel by 90 degrees about an axis perpendicular to the display panel; and a second glass-substrate disassembling apparatus;

wherein the rotation unit is placed downstream of the first glass-substrate disassembling apparatus in a forward direction and upstream of the second glass-substrate disassembling apparatus in the forward direction; and wherein each of said first and second glass-substrate disassembling apparatuses comprises a transfer unit capable of transferring the display panel in forward and rearward directions, a stopping unit that stops the display panel being transferred at a predetermined stop position, a fixing unit that fixes, at the stop position, the display panel stopped at the stop position, and a cutting unit comprising a glass cutting apparatus for cutting at least a single side of the display panel fixed by the fixing unit, said glass cutting apparatus comprising a glass-plate holding unit that holds a glass plate, comprising two glass substrates which are attached to each other, by supporting one end of the glass plate, a pair of cutters which form a pair of cut lines in opposite surfaces of an end portion of the glass plate which is not supported, by moving the pair of cutters and the end portion of the glass plate relative to each other, and a vibration unit that vibrates the end portion of the glass plate for forming vertical cracks just beneath the cut lines, wherein the vibration unit is located on an opposite side from the end portion with respect to the cut lines to vibrate the glass plate in a thickness direction thereof.

12. The display panel glass-substrate disassembling system according to claim 11, wherein the cutting unit in the first glass-substrate disassembling apparatus is structured to cut side portions of either longer sides or shorter sides of the display panel, and the cutting unit in the second glass-substrate disassembling apparatus is structured to cut side portions of the other sides, out of the longer sides and the shorter sides of the display panel.

13. A glass cutting method comprising:

holding a glass plate comprising two glass substrates which are attached to each other, by supporting one end of the glass plate;

moving a pair of cutters and an end portion of the glass plate which is not supported relative to each other to form a pair of cut lines on opposite surfaces of the end portion of the glass plate; and vibrating the end portion of the glass plate for forming vertical cracks just beneath the cut lines;

wherein the vibrating of the end portion of the glass plate comprises applying vibrations to the glass plate on an opposite side from the end portion with respect to the cut lines to vibrate the glass plate in a thickness direction thereof.

14. The glass cutting method according to claim 13, wherein the forming of the cut lines includes pressing, to surfaces of the glass plate, a pair of cutters installed oppositely to each other in a horizontal direction with the glass plate sandwiched therebetween, with pressing forces equal to each other and forming the pair of cut lines.

15. The glass cutting method according to claim 13, wherein the glass plate is a display panel, and the two glass substrates of the glass plate comprise a first glass flat plate and a second glass flat plate which are attached to each other with a spacing provided therebetween; and the holding of the glass plate includes holding the glass plate along the vertical direction.

16. A display panel glass-substrate disassembling method for disassembling a display panel comprising two glass substrates bonded to each other at peripheral portions thereof through a sealing adhesive agent to recycle the display panel, the glass-substrate disassembling method comprising:

stopping the display panel being transferred in a forward direction at a first stop position; and fixing, at the first stop position, the display panel stopped at the first stop position; and cutting at least a single side of the display panel fixed at the first stop position using a glass cutting method comprising holding a glass plate comprising two glass substrates which are attached to each other, by supporting one end of the glass plate, moving a pair of cutters and an end portion of the glass plate which is not supported relative to each other to form a pair of cut lines on opposite surfaces of the end portion of the glass plate, and vibrating the end portion of the glass plate for forming vertical cracks just beneath the cut lines, wherein the vibrating of the end portion of the glass plate comprises applying vibrations to the glass plate on an opposite side from the end portion with respect to the cut lines to vibrate the glass plate in a thickness direction thereof, wherein the glass plate is a display panel, and the two glass substrates of the glass plate comprise a first glass flat plate and a second glass flat plate which are attached to each other with a spacing provided therebetween, and wherein the holding of the glass plate includes holding the glass plate along the vertical direction.

17. The display panel glass-substrate disassembling method according to claim 16, wherein the fixing includes holding the display panel on a base table or pressing of the display panel.

18. The display panel glass-substrate disassembling method according to claim 16, further comprising:

transferring the display panel in a rearward direction, stopping the display panel at a second stop position different from the first stop position, fixing, at the second stop position, the display panel stopped at the second stop position, and cutting a single side of the display panel fixed at the second stop position, which is opposite from the single side cut in the cutting.

19. The display panel glass-substrate disassembling method according to claim 16, further comprising removing a cut portion of the display panel which has been cut in the cutting, wherein the removing includes the folding, downwardly, a portion of the unit for fixing the display panel in the cutting for dropping the cut single side.

20. A display panel glass-substrate disassembling method for disassembling a display panel comprising two glass substrates bonded to each other at peripheral portions thereof through a sealing adhesive agent to recycle the display panel, the glass-substrate disassembling method comprising:

stopping the display panel being transferred in a forward direction at a first stop position;

fixing, at the first stop position, the display panel stopped at the first stop position;

cutting at least a single side of the display panel fixed at the first stop position;

transferring the display panel in a rearward direction;

stopping the display panel at a second stop position;

fixing, at a second stop position, the display panel stopped at the second stop position;

cutting at least a single side of the display panel fixed at the second stop position;

transferring the display panel in the forward direction;

rotating, by 90 degrees, the display panel about an axis perpendicular to the panel;

transferring the rotated display panel in the forward direction;

stopping the display panel being transferred in the forward direction at a third stop position;

fixing, at the third stop position, the display panel stopped at the third stop position;

cutting at least a single side of the display panel fixed at the third stop position;

transferring the display panel in the rearward direction;

stopping the display panel at a fourth stop position;

fixing, at the fourth stop position, the display panel stopped at the fourth stop position; and cutting at least a single side of the display panel fixed at the fourth stop position; wherein each of said cutting of the at least a single side of the display panel at the first stop position, said cutting of the at least a single side of the display panel at the second stop position, said cutting of the at least a single side of the display panel at the third stop position, and said cutting of the at least a single side of the display panel at the fourth stop position, is carried out according to a glass cutting method comprising holding a glass plate comprising two glass substrates which are attached to each other, by supporting one end of the glass plate, moving a pair of cutters and an end portion of the glass plate which is not supported relative to each other to form a pair of cut lines on opposite surfaces of the end portion of the glass plate, and vibrating the end portion of the glass plate for forming vertical cracks just beneath the cut lines, wherein the vibrating of the end portion of the glass plate comprises applying vibrations to the glass plate on an opposite side from the end portion with respect to the cut lines to vibrate the glass plate in a thickness direction thereof.

* * * * *